United States Patent
Kido et al.

(10) Patent No.: US 6,616,788 B2
(45) Date of Patent: Sep. 9, 2003

(54) MANUFACTURING METHOD FOR A RESIN CONTAINER

(75) Inventors: Katsuyuki Kido, Seto (JP); Hirokazu Ishimaru, Toyota (JP); Masaki Terada, Toyota (JP); Yoichi Serino, Toyota (JP); Makoto Kito, Aichi-ken (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/940,799

(22) Filed: Aug. 29, 2001

(65) Prior Publication Data

US 2002/0025393 A1 Feb. 28, 2002

Related U.S. Application Data

(62) Division of application No. 09/035,750, filed on Mar. 6, 1998, now abandoned, which is a continuation of application No. PCT/JP97/02329, filed on Jul. 4, 1997.

(30) Foreign Application Priority Data

| Jul. 9, 1996 | (JP) | 8-178379 |
| Feb. 21, 1997 | (JP) | 9-37974 |
| Feb. 21, 1997 | (JP) | 9-37976 |
| Feb. 21, 1997 | (JP) | 9-37977 |
| Feb. 27, 1997 | (JP) | 9-44229 |
| Apr. 18, 1997 | (JP) | 9-102014 |
| Apr. 22, 1997 | (JP) | 9-104503 |

(51) Int. Cl.[7] .............................................. B29C 39/02
(52) U.S. Cl. .................... 156/245; 156/292; 156/308.2; 264/259
(58) Field of Search .................... 264/255, 259, 264/513, 516, 279, 162, 545; 156/212, 245, 308.2, 292; 220/4.14, 562, 563, 564

(56) References Cited

U.S. PATENT DOCUMENTS

| 3,342,365 A | 9/1967 | Lux et al. |
| 3,388,021 A | 6/1968 | Johnson |
| 3,449,182 A | 6/1969 | Wiltshire |
| 3,912,107 A | * 10/1975 | Baumann ........... 220/563 |
| 4,518,091 A | 5/1985 | Scheurenbrand |
| 4,741,457 A | 5/1988 | Joseph et al. |
| 5,344,038 A | 9/1994 | Freeman et al. |
| 5,398,839 A | * 3/1995 | Kleyn ............... 220/4.14 |
| 5,547,096 A | * 8/1996 | Kleyn ............... 220/560.03 |
| 5,589,241 A | 12/1996 | Stiles et al. |
| 5,913,451 A | 6/1999 | Madison |

FOREIGN PATENT DOCUMENTS

| EP | 0 468 810 | 1/1992 |
| FR | 818.225 | 9/1937 |
| GB | 1 439 774 | 6/1976 |
| JP | 49-71318 | 7/1974 |
| JP | 58-202112 | 11/1983 |
| JP | 62-179911 | 8/1987 |
| JP | 2-098542 | 4/1990 |
| JP | 5-229015 | 9/1993 |
| JP | 6-278223 | 10/1994 |
| JP | 6-278224 | 10/1994 |
| JP | 8-104340 | 4/1996 |
| JP | 10-157738 | 6/1998 |
| JP | 63-260424 | 10/1998 |

* cited by examiner

Primary Examiner—Jeff H. Aftergut
Assistant Examiner—Barbara J Musser
(74) Attorney, Agent, or Firm—Pillsbury Winthrop LLP

(57) ABSTRACT

In a state where a gas barrier sheet (10) having a gas barrier layer is held between a heat plate (12) and a pressing plate, the gas barrier sheet is disposed between two molds together with a sub tank (44) and a separator (46) constituting attachment parts, the molds are then closed and a resin is injection-molded forming a resin layer (36). A method for manufacturing a resin container by melt-adhering an intermediate molded product (38) and another intermediate molded product (38) constituting a pair therewith by heating with a heat plate (12) thereafter, and a resin container manufactured by this manufacturing method.

12 Claims, 32 Drawing Sheets

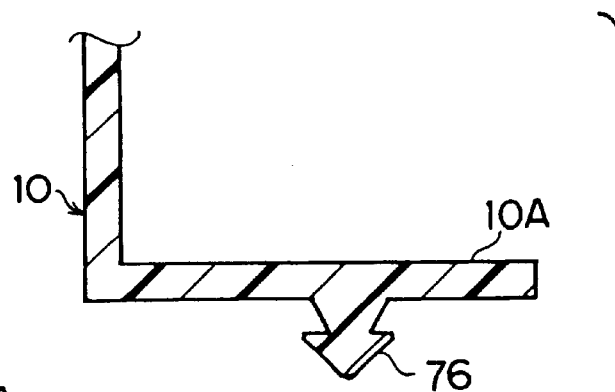
FIG.16A
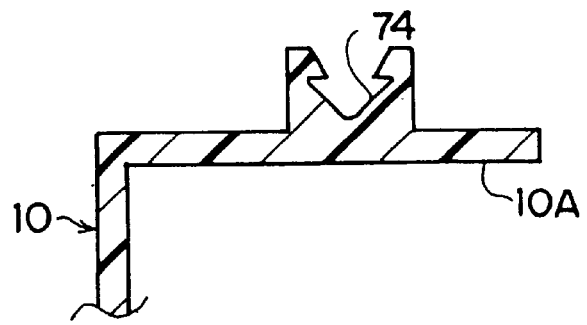
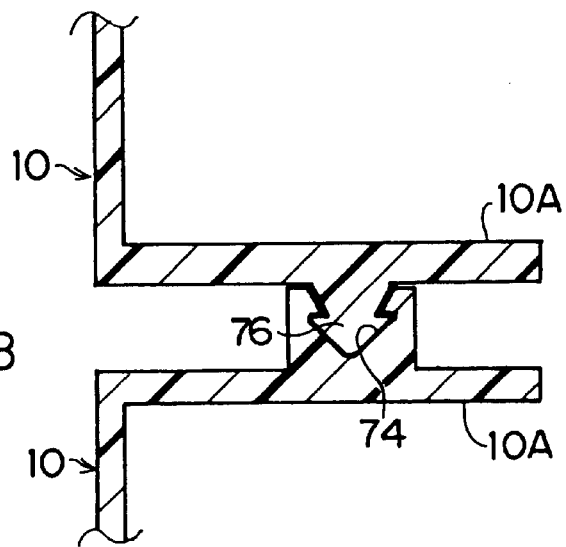
FIG.16B

MANUFACTURING METHOD FOR A RESIN CONTAINER

This application a division of application Ser. No. 09/035,750, filed Mar. 6, 1998, which was a continuation of International Application No. PCT/JP97/02329, filed Jul. 4, 1997, the benefit of both of which is claimed along with the benefit of the Japanese priority applications No. 8-178379 filed Jul. 9, 1996. No. 9-37974 filed Feb. 21, 1997, No. 9-37976 filed Feb. 21, 1997, No. 9-37977 filed Feb. 21, 1997, No. 9-44229 filed Feb. 27, 1997, No. 9-102014 filed Apr. 18, 1997, No. 9-104503 filed Apr. 22, 1997, the contents of all of the foregoing applications being incorporated by reference.

BACKGROUND ART

Conventionally, the disclosures in Japanese Patent Application Laid-Open (JP-A) No. 5-229015 for resin containers such as fuel tanks and the like mounted in automotive vehicles and methods for manufacturing the same have been known.

As shown in FIG. 36, in the method for manufacturing a resin container, firstly, a molten resin 122 in a high temperature state is extruded onto a convex metal mold 146 so as to conform to the measurements of the metal mold. Next, a vacuum is created in the suction holes 134 provided on an inner wall 132 of a concave metal mold 130 which corresponds to the shape of the convex metal mold 146 by a vacuum apparatus 140, and a film (a sheet member) 142 made of the same material as that of the resin 122 and having a gas barrier layer which prevents gasoline from permeating through is heated so as to adhere to the inner wall 132 of the concave metal mold 130. Then, the convex metal mold 146 and the concave metal mold 130 are die matched and heat compressed, and thereafter the molds are opened. The concave metal mold 130 holding an intermediate concave molded product formed in the above manner and kept in a high temperature state, and the other metal mold holding an intermediate concave molded product formed in the same manner and kept in a high temperature state are combined with each other and then are thermally compressed. Accordingly, the joint portions of the intermediate products adhere to each other in the high temperature state, so that the bonding strength is improved.

However, in the resin containers and the method for manufacturing the same mentioned above, when the seal members 142 are not securely die matched with each other in the bonding portions of the intermediate molded products, the level of gasoline permeability in the bonding portions is increased so that the gas permeation preventing performance is deteriorated. Accordingly, it has not been easy to obtain a resin container guaranteeing gas permeation prevention in the bonding portions.

In this case, the related art concerning the present invention includes Japanese Patent Application Laid-Open (JP-A) No. 63-260424 which discloses a fuel tank having a multi-layered resin structure, Japanese Patent Application Laid-Open (JP-A) Nos. 6-278223 and 6-278224 which disclose a fuel tank in which the peripheral portions of two concave resin containers is subjected to melt-adhesion, and Japanese Patent Application Laid-Open (JP-A) No. 58-202112 which discloses a fuel tank in which the peripheral portions of two containers comprising a resin layer and a metal foil are melted to adhere to each other.

Accordingly, the present invention takes the above facts into consideration and an object of the present invention is to provide a resin container and a method for manufacturing the same which can improve the gas permeation preventing performance in the bonding portions of intermediate molded products.

DISCLOSURE OF THE INVENTION

The present invention provides a resin container formed by superposing peripheral edge portions of at least two intermediate molded products, each of the intermediate molded products comprising at least two layers including a sheet member and a resin layer, in which the sheet members of the at least two intermediate molded products are melted and adhered to each other and the resin layers of the intermediate molded products are melted and adhered to each other. Accordingly, since the sheet members are securely adhered to each other in the bonding portion in which the peripheral edge portions of two intermediate molded products are superposed on each other, the gas permeation preventing performance in the bonding portion between the intermediate molded products can be improved.

Further, the present invention comprises an intermediate molded product forming step of forming concave intermediate molded products, each of the intermediate molded products comprising at least two layers including a sheet member and a resin layer, a sheet material melt-adhering step of superposing the peripheral edge portions of the intermediate formed products to melt and adhere the sheet members to each other, and a resin layer melt-adhering step of melt-adhering the resin layers of the intermediate molded products to each other. Accordingly, the resin container in which the gas permeation preventing performance in the bonding portion between the intermediate molded products is improved.

BRIEF DESCRIPTION OF THE DRAWINGS

FIG. 16A is an enlarged cross sectional view which shows a state before sheet member engaging portions are engaged in a method for manufacturing a resin container in accordance with a modified embodiment of the fourth embodiment of the present invention.

FIG. 16B is an enlarged cross sectional view which shows a state after sheet member engaging portions are engaged in a method for manufacturing a resin container in accordance with a modified embodiment of the fourth embodiment of the present invention.

BEST MODE FOR CARRYING OUT THE INVENTION

A first embodiment of a method for manufacturing a resin container (for example, a fuel tank for an automotive vehicle) in accordance with the present invention will be described in detail with reference to FIG. 1 through FIG. 8.

Figure 1:
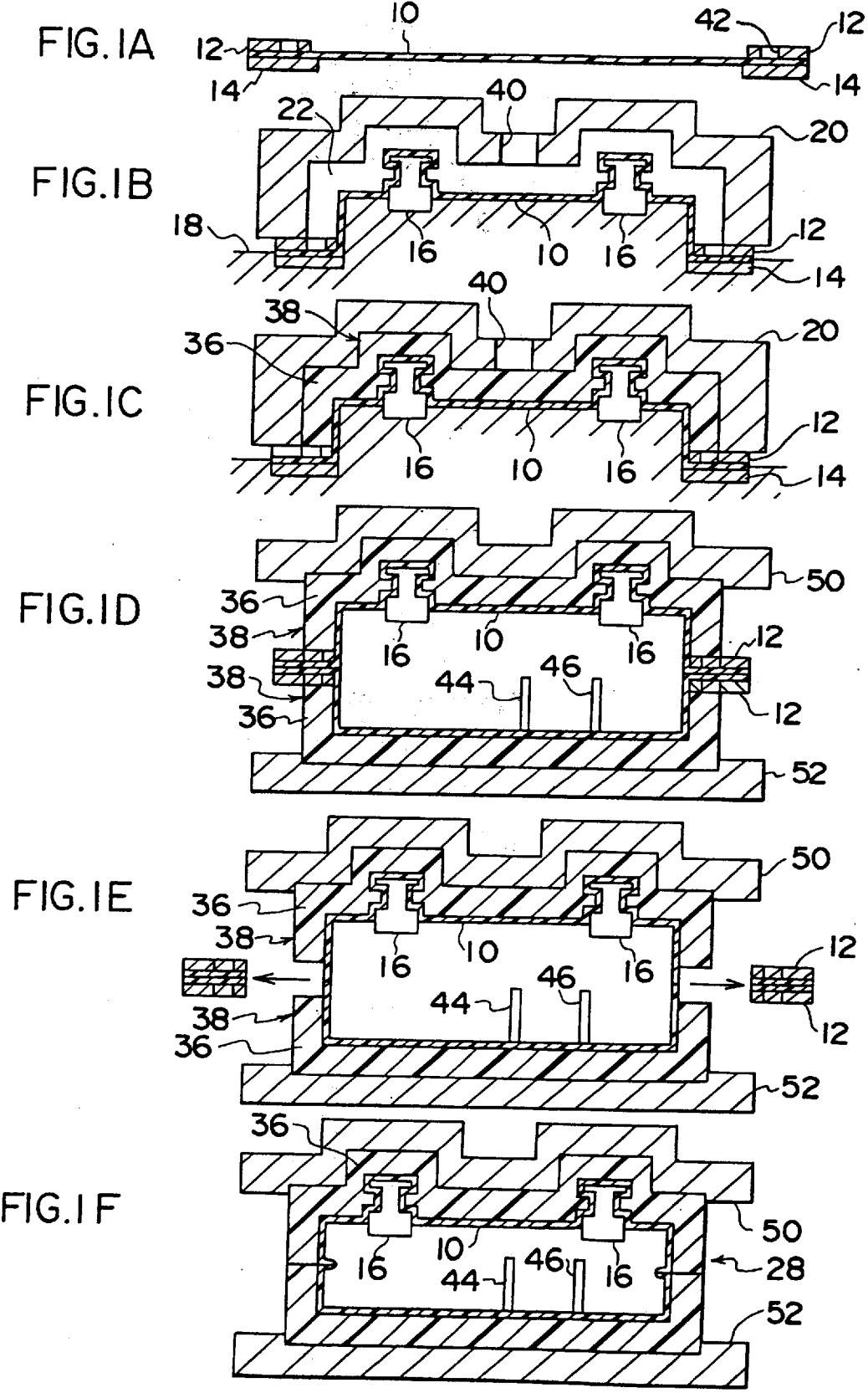
FIG. 1A is a cross sectional view of an apparatus and a container which shows one step of a method for manufacturing a resin container in accordance with a first embodiment of the present invention.
FIG. 1B is a cross sectional view of an apparatus and a container which shows one step of a method for manufacturing a resin container in accordance with a first embodiment of the present invention.
FIG. 1C is a cross sectional view of an apparatus and a container which shows one step of a method for manufacturing a resin container in accordance with a first embodiment of the present invention.
FIG. 1D is a cross sectional view of an apparatus and a container which shows one step of a method for manufacturing a resin container in accordance with a first embodiment of the present invention.
FIG. 1E is a cross sectional view of an apparatus and a container which shows one step of a method for manufacturing a resin container in accordance with a first embodiment of the present invention.
FIG. 1F is a cross sectional view of an apparatus and a container which shows one step of a method for manufacturing a resin container in accordance with a first embodiment of the present invention.
Figure 2:
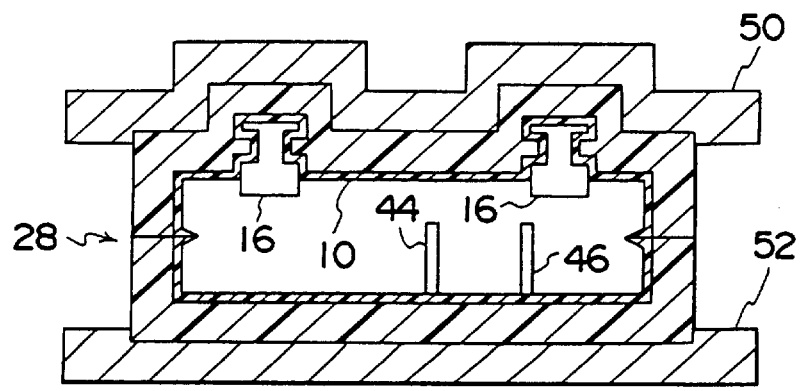
FIG. 2 is a cross sectional view of an apparatus and a container in cases where the pressure inside a saccate gas barrier sheet is reduced by a resin layer welding process of a method for manufacturing a resin container in accordance with a first embodiment of the present invention.
Figure 3:
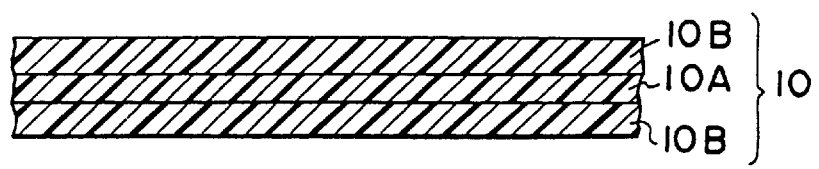
FIG. 3 is an enlarged partial cross sectional view of a gas barrier sheet used in a method for manufacturing a resin container in accordance with a first embodiment of the present invention.

Firstly, as shown in FIG. 1A, the peripheral edges of a gas barrier sheet 10 serving as a sheet member are held between heater containing heat plates 12 and pressing plates 14. In this case, as shown in FIG. 3, the gas barrier sheet 10 is structured so that a gas barrier layer 10P having a gas permeation preventing properties is held between resin layers 10Q made of the same resin as that of a base resin. The gas barrier layer 10P is also called as an anti-gas permeation layer and is made of an ethylene vinyl alcohol (EVOH) layer or a nylon (TRADE MARK) layer. The rosin layer 10Q is made of a high density polyethylene (HDPE) which is the same type of resin (for example, polyethylene resin) as that of the base resin. Examples of the gas barrier sheet 10 having the above structure include DAIAMILON MF, manufactured by Mitsubishi Plastics, Inc., and examples of the HDPE include F6040V manufactured by Nibon Poly olefin Inc. The anti-gas permeability of the gas barrier sheet 10 is Unproved by the gas barrier layer 10P, and the adhesiveness between the gas barrier sheet 10 and the base resin is improved by the resin layer 10Q.

Next, as shown in FIG. 1B, with the gas barrier sheet 10 covering the outer side (the outer side of the container once it has been formed into a container shape) of attachment parts such as a cut off valve 16, the gas barrier sheet 10 and the attachment parts such as the cut off valve 16 and the like are set on a base resin (hereinafter, referred to as resin layer 36) forming lower mold 18. In this case, the gas barrier sheet 10 can be easily adhered to the surface of the lower mold 18 by reducing the pressure between the lower mold 18 and the gas barrier sheet 10. In this state, an upper mold 20 is set onto the lower mold 18 in such a way that a cavity 22 is formed between the gas barrier sheet 10 and the inner surface of the upper mold 20.

Figure 4:
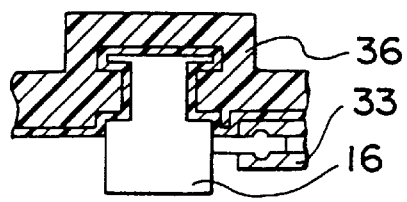
FIG. 4 is an enlarged cross sectional view of an attached part (a cut off valve) in a method for manufacturing a resin container in accordance with a first embodiment of the present invention.
Figure 5:
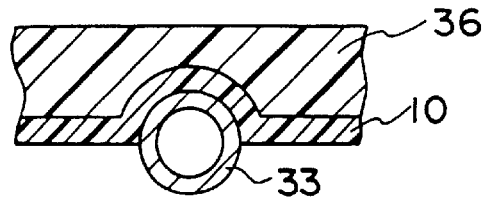
FIG. 5 is an enlarged cross sectional view of an attached part (a pipe) in a method for manufacturing a resin container in accordance with a first embodiment of the present invention.
Figure 8:
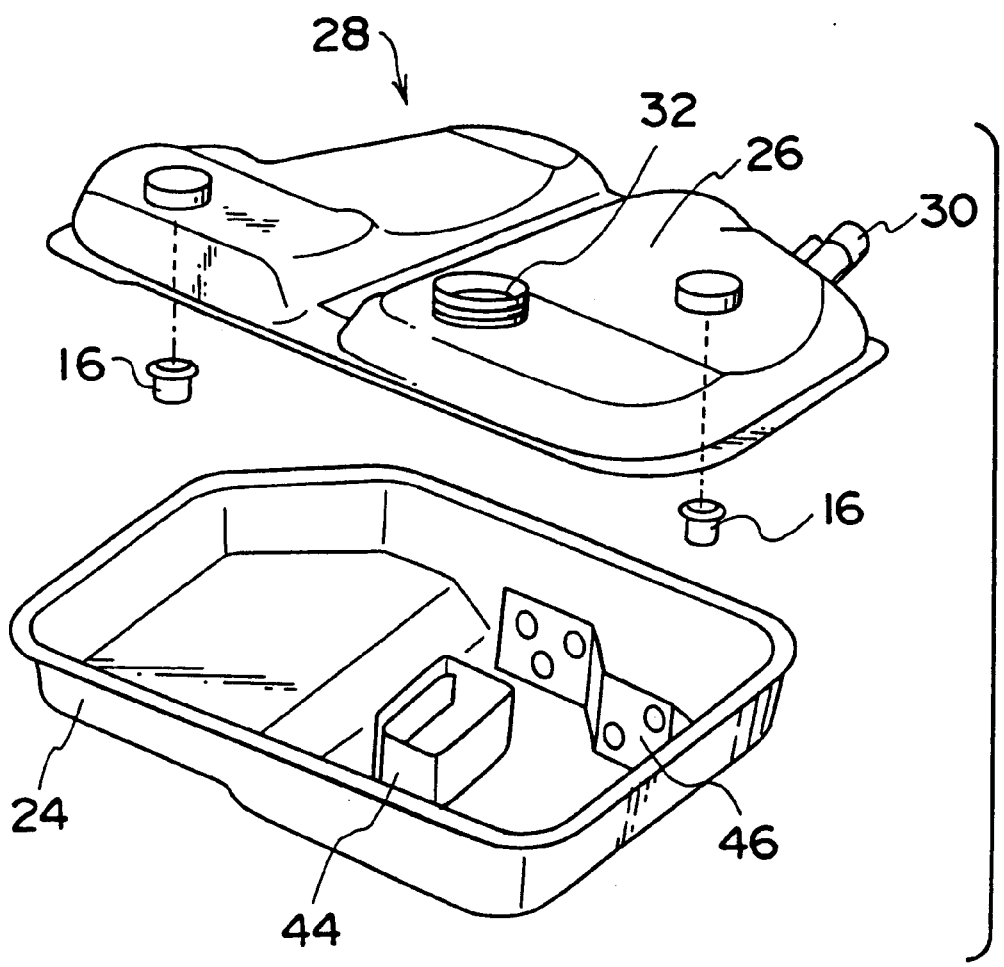
FIG. 8 is a perspective view of a resin container manufactured by a method for manufacturing a resin container in accordance with a first embodiment of the present invention.

As shown in FIG. 8, FIG. 4, and FIG. 5, the cut off valve 16 is a pipe for expelling the gas which builds up in the top of the inside of the fuel tank when fuel is fed through an inlet pipe 30 into the fuel tank which is a resin container 28 comprising a lower part 24 and an upper part 26. This pipe closes when the fuel fills up to the valve position and remains open when the fuel level is below the valve position. In this case, the gas expelled from the cut off valve 16 is expelled to the outside through a pipe 33 passing through a fuel pump mounting opening 32.

Accordingly, since the structure is made in such a way that the gas barrier sheet 10 covers parts such as the cut off valve 16 and the like, no hole is pierced on the barrier sheet 10, and the gas permeation preventing performance is improved in regions where parts such as the cut off valve 16 and the like are disposed.

Next, as shown in FIG. 1C, a resin layer 36 is injection molded onto the outer side of the gas barrier sheet 10. Namely, the resin layer 36 is molded by pouring a molten resin into the cavity 22 through a hole 40 in the upper mold 20 and then cooling and solidifying it. After the resin layer 36 has solidified, the pressing plate 14 is removed and an intermediate molded product 38 having a concave shape and open peripheral edges is formed (intermediate molded product molding process). In the case of hot stamping, a heated base resin sheet is disposed on the gas barrier sheet, and a resin layer is formed by stamping with a press.

Figure 6:
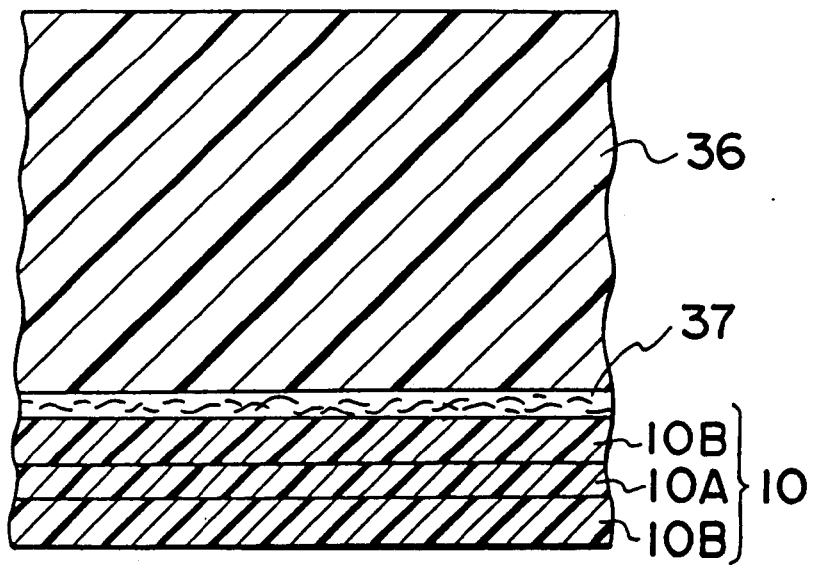
FIG. 6 is an enlarged partial cross sectional view of a gas barrier sheet and a resin layer in a state where the gas barrier sheet and the resin layer are welded together in a method for manufacturing a resin container in accordance with a first embodiment of the present invention.

As shown in FIG. 6, both in cases where the resin layer 36 is formed by injection molding as well as in cases where it is formed by hot stamping, since the outer side resin layer (the HDPE layer) 10Q of the gas barrier sheet 10 is softened to a gel state from the bear of the resin layer 36, an interlinked molecular chain between the resin layer 36 and the outer resin layer of the gas barrier sheet 10 is formed in a molten layer 37, so that the resin layer 36 and the gas barrier sheet 10 become closely adhered as a single body.

Figure 7:
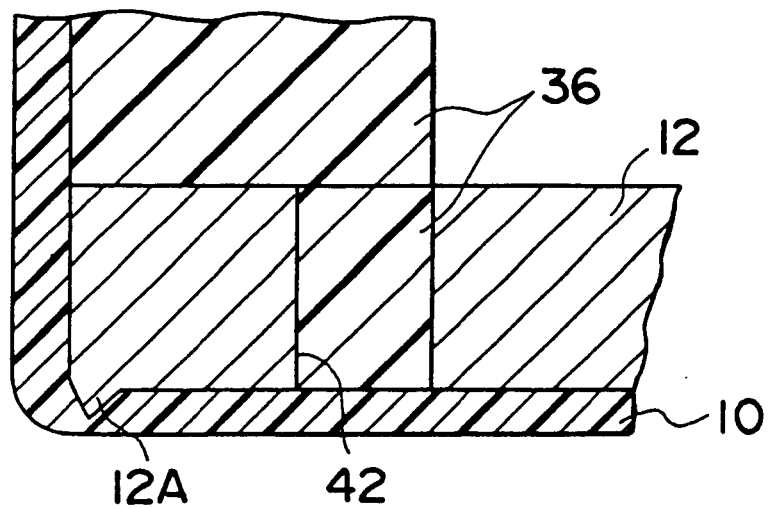
FIG. 7 is an enlarged cross sectional view of a bonded portion of a heat plate, a gas barrier sheet, and a resin layer near the heat plate in a method for manufacturing a resin container in accordance with a first embodiment of the present invention.

As shown in FIG. 7, by piercing a hole 42 in the heat plate 12 so as to introduce the molten resin to the gas barrier sheet 10 through the hole 40, the portion of the gas barrier sheet 10 in contact with the heat plate 12 is held on the heat plate 12, thereby preventing the portion of the gas barrier sheet 10 in contact with the heat plate 12 from creasing. Since the portion of the gas barrier sheet 10 in contact with the heat plate 12 corresponds to the bonding portion between the gas barrier sheets 10, the welding reliability between the gas barrier sheets 10 is improved due to no creases in this portion being generated.

In this case, as shown in FIG. 1D, a sub tank 44 and a separator 46 attachment parts are integrally formed on the fuel tank lower part 24. Since the sub tank 44 and the separator 46 are made of HDPE and do not include EVOH, they are integrally formed with the resin layer 36 when the resin layer 36 is formed.

Next, as shown in FIG. 1D, the intermediate molded product 38 is combined with at least one other intermediate molded product 38 able to be combined therewith in a state where the peripheral edges of the opening thereof and the peripheral edges of the gas barrier sheet 10 (sheet member melt-adhering step) are aligned. In this case, the pressing plate 14 has already been removed from the intermediate molded product 38 in this state.

Next, as shown in FIG. 1D, by heating the heat plates 12 of each of the combined intermediate molded products 38 to about 240° C. and softening to a gel state the gas barrier sheet 10 and the resin layer 36 portions of the combined intermediate molded products 38 which are in contact with the heat plate 12, the gas barrier sheets 10 of the respective combined intermediate molded products 38 are melt-adhered to each other so as to form a gas barrier sheet bag.

Next, as shown in FIG. 1E, in a state where the resin layer portions in contact with the respective heat plates 12 are softened, the respective heat plates 12 of the combined intermediate molded products 38 is pulled out together with the gas barrier sheet 10 portion disposed therebetween.

Next, as shown in FIG. 1F, the combined intermediate molded products 38 are pressed together by moving a pair of molds, 50 (upper mold) and 52 (lower mold), of the welding press adjacent to each other so as to weld the peripheral edges of the resin layers 36 of the combined intermediate molded products 38 to each other (resin welding step).

At this time, since the welding of the peripheral edges of the resin layers 36 must be performed in a state where the portion in contact with the heat plate of the resin layer 36 is softened to a gel state, it must be performed immediately after pulling out the heat plate.

Further, the heat plate 12 is constructed in such a manner as to be able to be separated in several peripheral directions so as to be pulled apart in at least two directions (for example, four directions) with respect to the intermediate molded product 38.

Further, in order that the portions of the gas barrier sheets 10 between the heat plates 12 can be pulled out together with the heat plates 12 after being cut away from the bag portion, a fixed cutter 12A for cutting the portions of the gas barrier sheets 10 between the heat plates 12 away from the bag portion is formed on the inner peripheral end of the heat plate 12 (refer to FIG. 7), and is structured so that when the gas barrier sheet 10 is held between the pair of heat plates 12, the portions of the gas barrier sheets 10 between the opposing fixed cutters 12A are constricted so that the gas barrier sheets 10 can be easily cut by pulling out the heat plates 12 at the constricted portion.

Further, since the gas barrier sheets 10 of each of the intermediate molded products 38 are put under higher pressure where the fixed cutters 12A are positioned than in other regions, the molten resin layer 10Q between rite gas barrier layers 10P flows out and the two gas barrier layers 10 cut through to join each other. The molecules of the two gas barrier layers 10 are thus linked together in a chain and the gas barrier layers 10P are sealed to each other in an air tight manner. Accordingly, as the gas barrier sheets 10 are sealed to each other in an air tight manner, a bag-like gas barrier sheet 10 is formed.

Further, between the processes shown in FIG. 1E and FIG. 1F of the resin melt-adhering steps, because the sealed portions of the gas barrier sheets ate hanging slackly the pressure is reduced inside the bag-like gas barrier sheet 10, so that the slack part of the gas barrier sheet 10 dose not come between the facing edges of the resin layers, but instead protrudes inside the resin container (fuel tank), as is shown in FIG. 1F.

The pressure reduction pipe used at this time can be an attachment pipe of the resin container (the fuel tank) 28, and this is passed through one of the openings necessarily formed in the resin container such as the fuel pump mounting opening 32, the inlet pipe opening 30, and the like so as to lead to the outside of the container. The pressure reduction pump is connected to this, and the pressure inside the container can be reduced.

Next, the operations of the method for manufacturing the resin container in accordance with the first embodiment will be explained.

In the method for manufacturing the resin container of the first embodiment, the attachment part 16 is covered on the outside by the gas permeation preventing gas barrier sheet 10. Accordingly, it is not necessary to pierce a hole in the gas barrier sheet 10 and the resin layer 36 in the location of the attachment part 16 as is done in the conventional art. As a result of this, the gas permeation preventing performance and the reliability of the container in the region of the attachment part 16 is greatly improved. Further, since the resin container 28 manufactured by the method mentioned above is structured so that the resin layers 36 and the gas barrier sheets 10 of each of two intermediate formed products 38 are respectively melt-adhered to each other, the gas barrier sheets 10 do not peel apart from each other and the gas permeation preventing performance and the reliability thereof is high. Further, since there is no hole piercing process and no melt-adhering step process between the attachment part and the container as in the conventional manufacturing method, the number of steps and the consequent manufacturing costs can be correspondingly reduced.

Further, since the bonding portions of the gas barrier sheets 10 and the resin layers 36 are in close contact with the heat plate 12, the heat transfer between the heat plate 12 and the gas barrier sheets 10 and resin layers 36 can be efficiently performed, so that the reliability of the bonding strength and the air tightness is increased when welding the intermediate molded products 38 to each other. Further, since the melt-adhesion is performed by holding the gas barrier sheets 10 of the respective intermediate molded products 38 between the high rigid heat plates 18, warps and deformities in the bonded portion are restricted, so that the reliability of the bonding strength and the air tightness when welding the gas barrier sheets 10 of the respective intermediate molded products 38 is increased.

Further, since a hole 42 has been pierced in the heat plate 12, and molten resin has been injected into this hole 42 so that the resin layer 36 and the portion of the gas barrier sheet 10 in contact with the heat plate 12 connect and join with each other, the contact between the gas barrier sheet 10 and the resin layer 36 with the heat plate 12 is strengthened so that the contact portion between the gas barrier sheet 10 and the heat plate 12 is prevented from generating creases.

Further, by strengthening the connection between the heat plate 12 and the part of the gas barrier sheet 10 in contact with the heat plate 12, the portion (burr) of the gas barrier sheets 10 between the heat plates 12 is securely pulled out together with the heat plate 12 and is cut apart from the bag-like portion at the same time as the heat plate 12 is pulled out.

Further, when the pressure is reduced inside the bag-like gas barrier sheet during the melt-adhesion of the resin layers 36 to each other, the slack portion of the gas barrier sheet 10 is prevented from protruding between the adhered surfaces of the resin layers 36 after pulling out the heat plate 12. Therefore the resin layers 36 of the intermediate molded products 38 can be securely melt-adhered to each other and the adhering strength and the adhering reliability of the resin layer 36 can be improved.

Moreover the thickness and quality of the material of the gas battier layer 10P of the gas barrier sheet 10 in the upper section 26 of the resin container 28 may be more moldable in comparison with the thickness or quality of the material of the gas barrier layer 10P of the gas barrier sheet 10 in the lower section 24 of the resin container 28. In this case, the thickness and quality of the material of the gas barrier layer 10P of the gas barrier sheet 10 in the upper section 26 of the resin container 28 may be inferior in gas permeation preventing properties in comparison with the thickness and material of the gas barrier layer 10P of the gas barrier sheet 10 in the lower section 24 of the resin container 28. Accordingly, the moldability of the upper section 26 of tire resin container 28 which has larger protuberances can be improved and together with this, the gas permeation of the lower section 24 of the resin container 28, in which the gas permeation is easily increased, can be restricted.

Next, the second embodiment of a method for manufacturing a resin container in accordance with the present invention will be explained in detail with reference to FIG. 9 through FIG. 11.

In this case, the same reference numerals will be attached to the same elements as those of the first embodiment, and the explanation thereof will be omitted.

Figure 9:
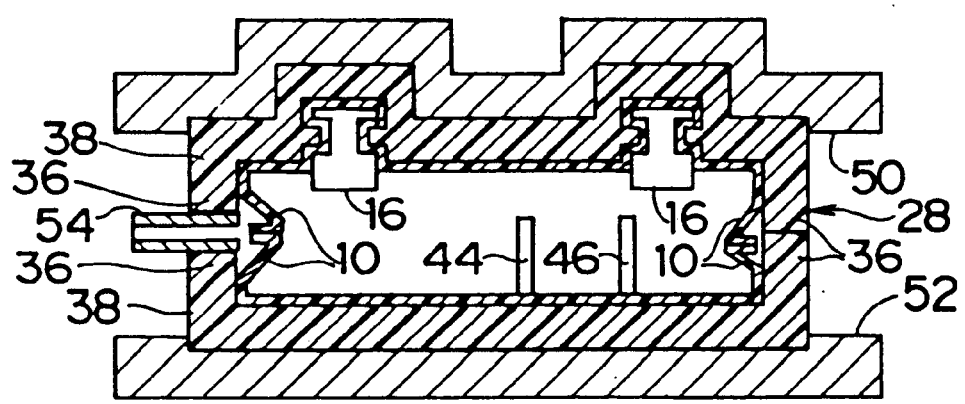
FIG. 9 is a cross sectional view of an apparatus and a container which shows a gas discharge process of a method for manufacturing a resin container in accordance with a second embodiment of the present invention.

As shown in FIG. 9, in the second embodiment, when the combined intermediate molded products 38 are pressed to each other by moving the pair of molds 59 (upper mold) and 52 (lower mold) of the welding press in close to each other so that the peripheral edges of the resin layers 36 of the combined intermediate molded products 38 are melt-adhered to each other (resin melt-adhering step), a pipe 54 serving as a connecting passage for connecting the inside to the outside of the resin layer 36 is provided in the joint of the resin layer 36.

Figure 10:
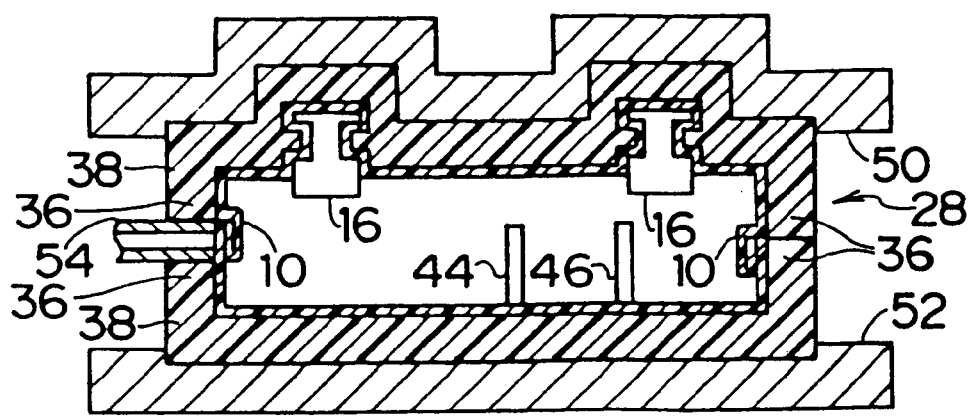
FIG. 10 is a cross sectional view of an apparatus and a container which shows a state after a gas discharge step is completed in a method for manufacturing a resin container in accordance with a second embodiment of the present invention.

Next, as shown in FIG. 10, by connecting a pressure reducing pump (not illustrated) to the pipe 54, the gas between the gas barrier sheet 10 and the resin layer 38 can be exhausted and the slack part of the gas barrier sheet 10 protruding inside the resin container (fuel tank) 28 is brought into contact with the resin layer 38 (gas exhausting step).

At this time, the gas barrier sheet 10 can be melt-adhered to the resin layer 38 by the temperature of the resin layer 38.

Figure 11:
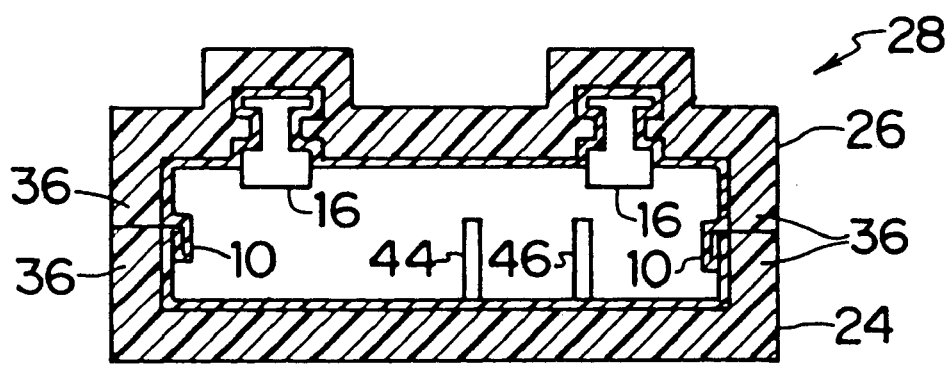
FIG. 11 is a schematical cross sectional view of a container manufactured by a method for manufacturing a resin container in accordance with a second embodiment of the present invention.

Finally, the pipe 54 for exhausting the gas is closed, the portion of the pipe 54 projecting from the resin container (the fuel tank) 28 is cut and removed by a cutter and the like, and as shown in FIG. 11, the resin container (the fuel tank) 28 is removed from the pair of molds 50 (upper mold) and 52 (lower mold) of the melt-adhering press.

Next, the operations of the method for manufacturing the resin container in accordance with the second embodiment will be explained.

In the method for manufacturing the resin container in accordance with the second embodiment, since in the gas exhausting step (refer to FIG. 9), the gas between the gas barrier sheet 10 and the resin layer 36 is exhausted through the pipe 54 is mounted in the joint of the resin layer 36 connecting the inside to the outside thereof, any gas remaining between the gas barrier sheet 10 and the resin layer 36 is removed and any capacity reduction of the resin container (the fuel tank 28) can be prevented.

Further, in the method for manufacturing the resin container in accordance with the second embodiment, since in the gas exhausting process (refer to FIG. 9) the gas barrier sheet 10 is melt-adhered to the resin layer 38 by the temperature of the resin layer 38, the gas barrier sheet 10 can be securely held. Further, since it is not necessary to independently heat either the gas barrier sheet 10 or the resin layer 38, productivity is improved.

In the second embodiment the process for injection molding is shown, however, the present invention can be applied to injection press molding, hot flow stamping molding, and sheet flow stamping molding.

Next, a third embodiment of a method for manufacturing a resin container in accordance with the present invention will be explained in detail with reference to FIG. 12 and FIG. 13.

In this case, the same reference numerals will be attached to the same elements as those of the first embodiment, and the explanation thereof will be omitted.

Figure 12:
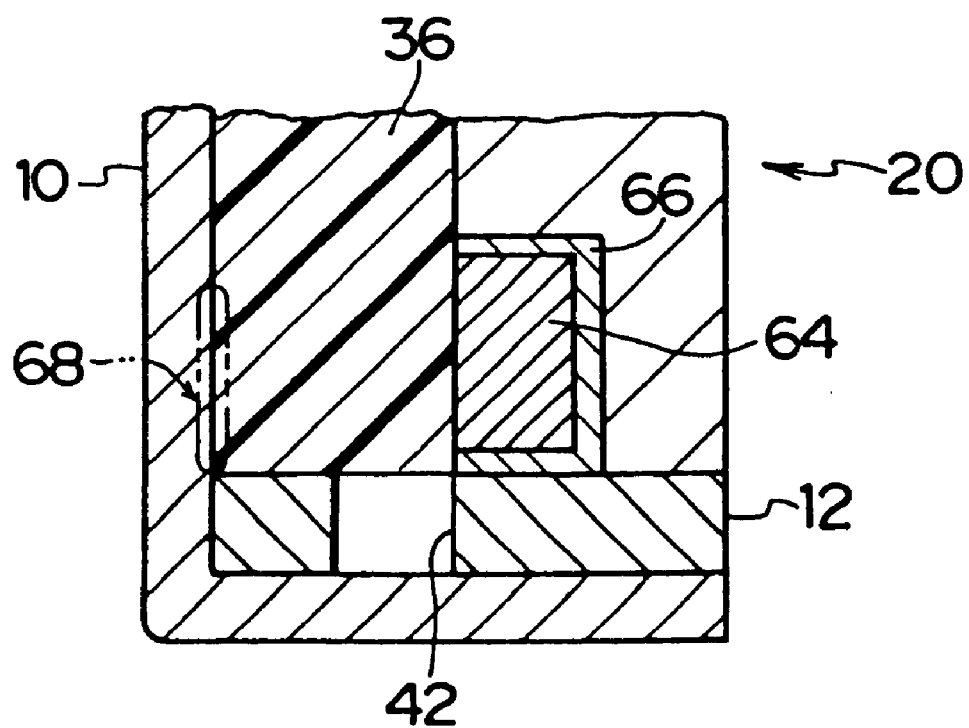
FIG. 12 is an enlarged cross sectional view of a bonded portion of a heat plate, a gas barrier sheet, and a resin layer near the heat plate in a method for manufacturing a resin container in accordance with a third embodiment of the present invention.

As shown in FIG. 12, in the third embodiment, a cooling portion 64 is provided in the portion which is brought into contact with the peripheral edge of the resin layer 36 of the upper mold 20 used for the intermediate molded product molding process, and a heat insulating material 66 is provided between the cooling portion 64 and the upper mold 20. In this case, the cooling portion 64 is constructed, for example, from a pipe through which a cooling water passes.

Accordingly, since the temperature of the peripheral edge of the resin layer 36 is decreased by the cooling portion 64, thereby restricting the temperature increase of the peripheral edge of the gas barrier sheet 10, the reliability of the gas barrier sheet 10 can be improved. Further, a non-melt-adhered portion 68 between the resin layer 36 and the gas barrier sheet 10 is formed along the peripheral edge of the resin layer 36.

Further, in the resin melt-adhering step, since a non-melt-adhered welded portion 68 is formed between the gas barrier sheet 10 and the peripheral edge of the resin layer 36, the gas barrier sheet 10 can be bent in the non-melt-adhered portion 68. Accordingly, since the gas barrier sheet 10 is not affected by the influence of the heat, localized elongation of the gas barrier sheet 10 can be restricted. As a result of this, the reliability of the gas barrier sheet 10 can be improved.

Next, operations of the method for manufacturing the resin container in accordance with the third embodiment will be explained.

In the method for manufacturing the resin container in accordance with the third embodiment, since the temperature of the peripheral edge of the resin layer 36 is decreased by the cooling portion 64 formed in the upper mold 20, thereby restricting the temperature increase of the peripheral edge of the gas barrier sheet 10, the reliability of the gas barrier sheet 10 can be improved. Further, since the non-melt-adhered portion 68 between the resin layer 36 and the gas barrier sheet 10 is formed along the peripheral edge of the resin layer 36, the gas barrier sheet 10 can be bent in the non-melt-adhered portion 68 at the same time as the slack of the gas barrier sheet 10 is pushed inside the resin container (fuel tank) 28. Accordingly, since the gas barrier sheet 10 is not affected by the influence of the heat, localized elongation of the gas barrier sheet 10 is restricted and the reliability of the gas barrier sheet 10 can be improved.

Figure 13:
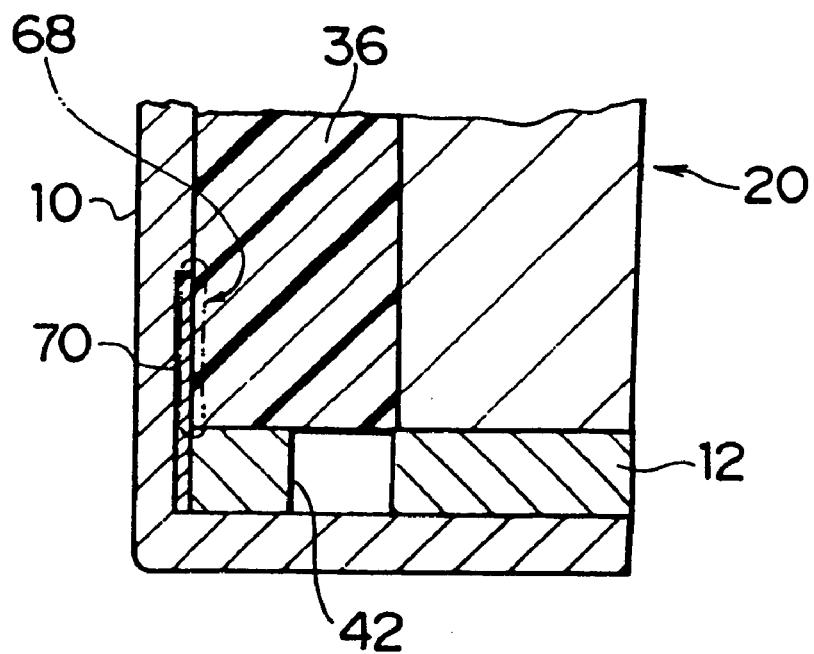
FIG. 13 is an enlarged cross sectional view of a bonded portion of a heat plate, a gas barrier sheet, and a resin layer near the heat plate in a method for manufacturing a resin container in accordance with a modified embodiment of the third embodiment of the present invention.

As shown in FIG. 13, for example, a structure wherein a piece of Teflon tape may be preliminarily disposed on the peripheral edge portion of the gas barrier sheet 10 as a member which is not melt-adhered with the resin layer 36 may be utilized. As the Teflon tape 70 is in contact with the peripheral edge portion of the resin layer 36, it is able not only to inhibit the temperature of the peripheral edge of the barrier sheet 10 from increasing but also to allow the elongation of the gas barrier sheet 10 to be restricted due to non-melt-adhered portions in the peripheral edges portions of the resin layer 36 and the gas barrier sheet 10 through the Teflon tape 70.

Further, in the third embodiment, the process for injection molding is shown, however, the present invention can be applied to injection press molding, hot flow stamping molding, and sheet flow stamping molding.

Next, a fourth embodiment of a method for manufacturing a resin container in accordance with the present invention will be explained in detail with reference to FIG. 14 through FIG. 17.

In this case, the same reference numerals will be attached to the same elements as those of the first embodiment, and the explanation thereof will be omitted.

Figure 14A:
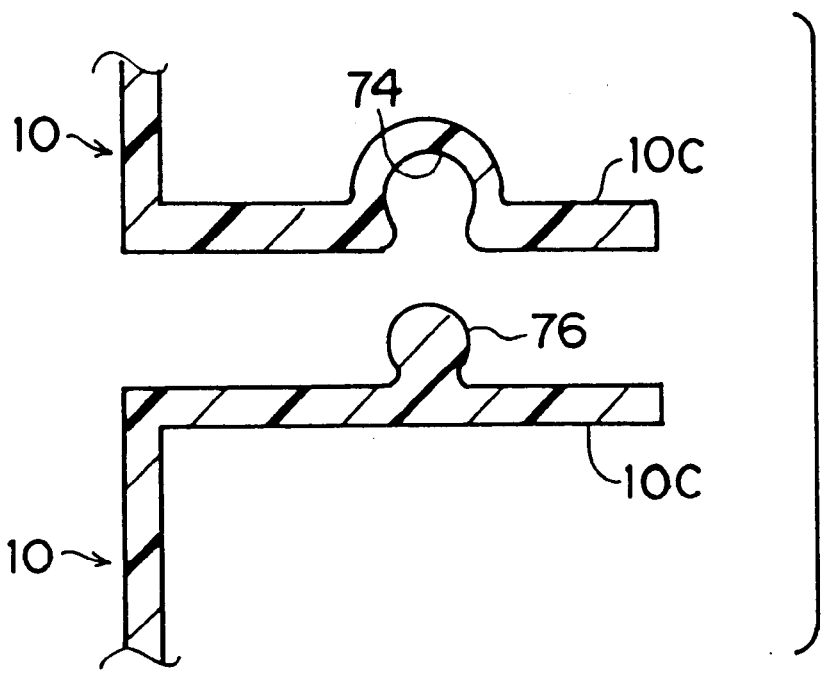
FIG. 14A is an enlarged cross sectional view which shows a state before sheet member engaging portions are engaged in a method for manufacturing a resin container in accordance with a fourth embodiment of the present invention.
Figure 14B:
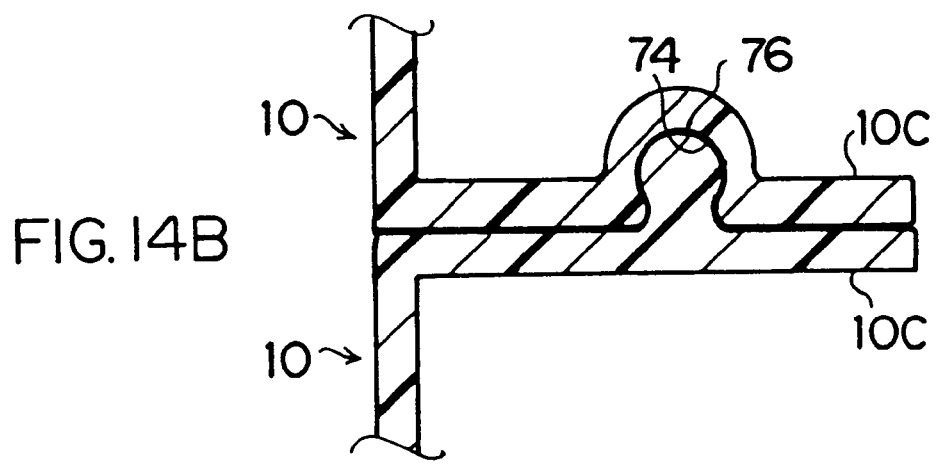
FIG. 14B is an enlarged cross sectional view which shows a state after sheet member engaging portions are engaged in a method for manufacturing a resin container in accordance with a fourth embodiment of the present invention.
Figure 15:
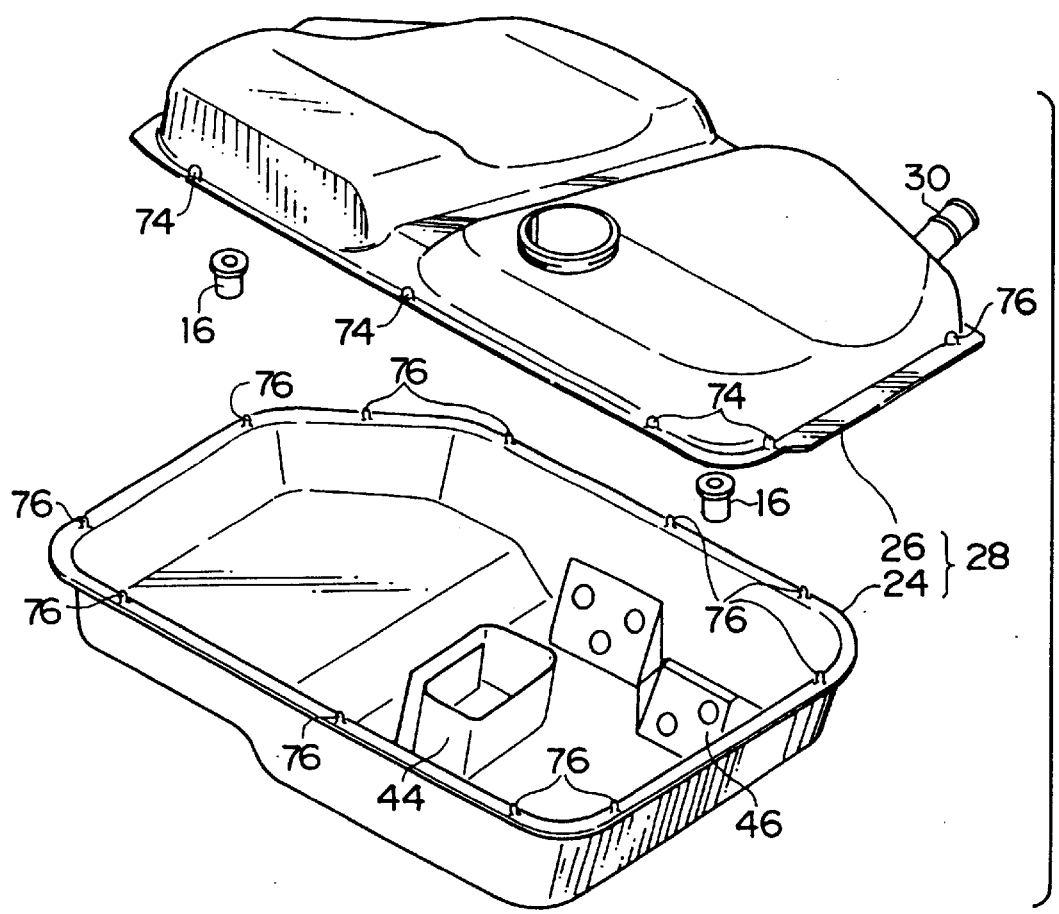
FIG. 15 is an exploded perspective view of a container manufactured by a method for manufacturing a resin container in accordance with a fourth embodiment of the present invention.

As is shown in FIG. 14A, in the fourth embodiment hook shaped engaging concave 74 and convex 76 portions are integrally formed in advance by press molding or the like at predetermined intervals on the connecting sections 10C of the peripheral edges of both gas barrier sheets 10 to act as engagers, as is also shown in FIG. 15. After these concave 74 and convex 76 engaging portions have engaged with each other the connecting sections 10C of the peripheral edges of both gas barrier sheets 10 are melt-adhered together (sheet member melt-adhering step), as is shown in FIG. 14B.

Accordingly, in the resin container (fuel tank) 28 manufactured by this manufacturing method, engaging concave portions 74 and engaging convex portions 76 are respectively formed in the peripheral edges of the gas barrier sheets 10 at predetermined intervals.

Next, operations of the method for manufacturing the resin container in accordance with the fourth embodiment will be explained.

In the method for manufacturing the resin container in accordance with the fourth embodiment, since the connecting portions 10C of the peripheral edge portions of both of the gas barrier sheets 10 is melt-adhered so as to form a bag-like shape after the engaging concave portions 74 and the engaging convex portions 76 previously formed in necessary portions of the connecting sections 10C of the peripheral edge portions of both of the gas barrier sheets 10 are engaged with each other in the sheet member melt-adhering step, the creases in the connecting sections of the gas barrier sheets 10 generated by the slack which is produced in the peripheral edge portions of the gas barrier sheets 10 at a time of manufacturing can be restricted. As a result of this, the reliability of the gas barrier sheets 10 can be improved, and in addition to this, the air tightness of the gas barrier sheet 10 is improved. Further, the melt-adhering operability of the peripheral edge portions of the gas barrier sheets 10 is improved.

Figure 17A:
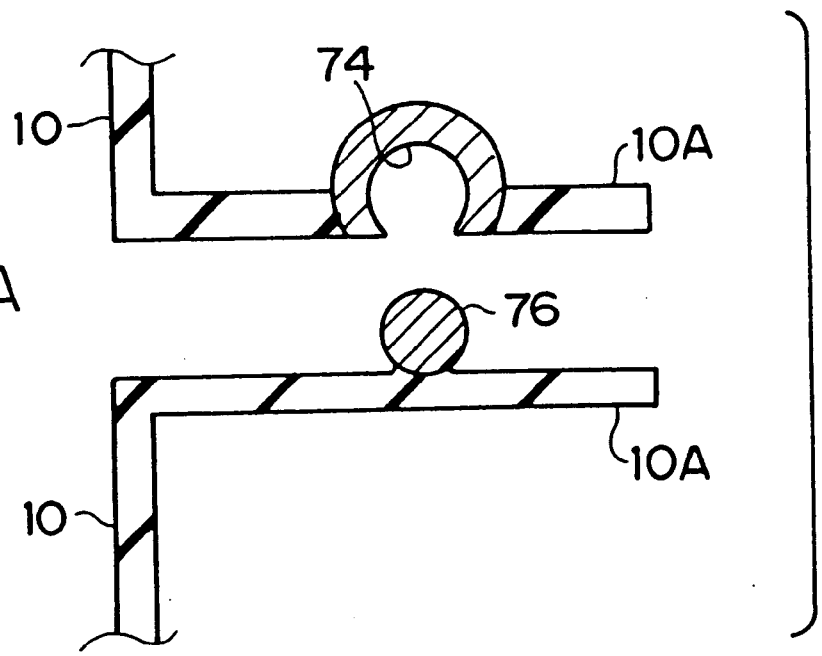
FIG. 17A is an enlarged cross sectional view which shows a state before sheet member engaging portions are engaged in a method for manufacturing a resin container in accordance with a further modified embodiment of the fourth embodiment of the present invention.
Figure 17B:
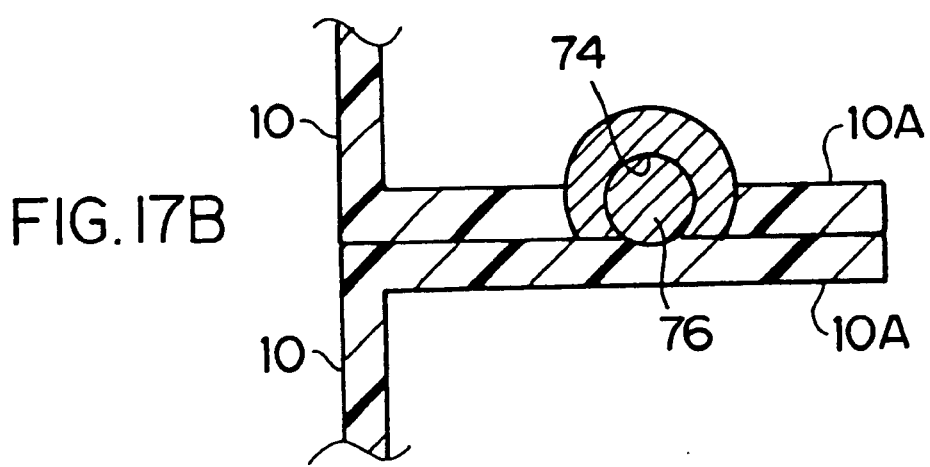
FIG. 17B is an enlarged cross sectional view which shows a state after sheet member engaging portions are engaged in a method for manufacturing a resin container in accordance with a further modified embodiment of the fourth embodiment of the present invention.

Further, for example, as shown in FIG. 16A and FIG. 16B, the shape of the engaging concave portions 74 and the engaging convex parts 76 may be made in other shapes such as an arrow head shape and the like. Moreover, as shown in FIG. 17A and FIG. 17B, the structure may be made so that the engaging concave portion 74 and the engaging convex portion 76 are respectively inserted or fixed to the connecting portions 10C of the peripheral edge portions of each of the gas barrier sheets 10 as independent members.

Further, in the fourth embodiment, the process for injection molding is shown, however, the present invention can be applied to injection press molding, hot flow stamping molding, and sheet flow stamping molding.

Next, a fifth embodiment of a method for manufacturing a resin container in accordance with the present invention will be explained in detail with reference to FIG. 18.

In this case, the same reference numerals will be attached to the same elements as those of the first embodiment, and the explanation thereof will be omitted.

Figure 18:
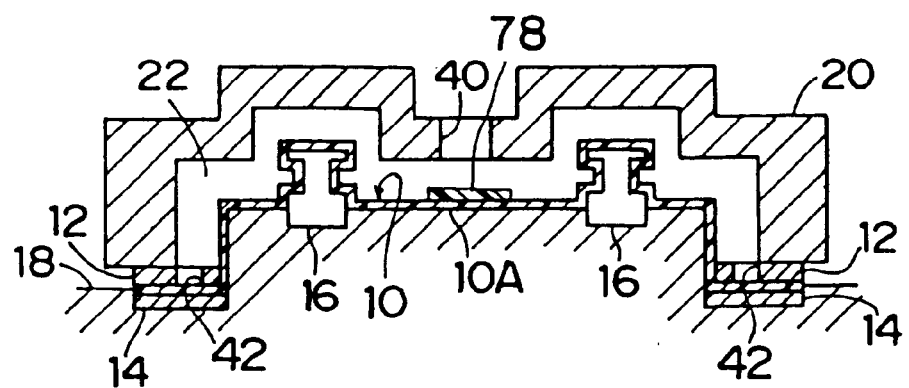
FIG. 18 is a cross sectional view of an apparatus and a container which shows one step of a method for manufacturing a resin container in accordance with a fifth embodiment of the present invention.

As shown in FIG. 18, in the fifth embodiment, a polyamide resin (PA) layer 78 serving as a reinforcing layer is formed on the gas barrier sheer 10. The poly-amide resin layer 78 is formed in advance on the portion 10P of the gas barrier sheet 10 which is opposite the resin injecting bole 40 provided in the upper mold 20 and an area surrounding the portion 10P.

Next, operations of the method for manufacturing the resin container in accordance with the fifth embodiment will be explained.

In the method for manufacturing the resin container in accordance with the fifth embodiment, when molten resin is poured onto the gas barrier sheer 10 disposed on die lower mold 18 from the resin injecting hole 40 provided on the upper mold 20, the portion 10P of the gas barrier sheer 10 opposite the resin injecting hole 40 and the area surrounding this portion are affected by the influence of the heat from the molten resin which is further heated by the shearing force from the resin injecting hole 40 and the frictional force from the molten resin.

At this tune, in the fifth embodiment, the gas barrier sheet 10 can be prevented from melting by the poly-amide resin layer 78 which is no; melted by the injected resin and is disposed on the portion 10P of tire gas barrier sheet 10 and the area surrounding this portion opposite the resin injecting hole 40. As a result of tins, the reliability of the gas barrier sheet 10 can be improved.

The reinforcing layer is not limited to the poly-amide layer 78 and the other members such as metal foil and the like which are not melted by the injected resin may be used. Further, the reinforcing layer may be formed on the entire surface of the gas barrier sheet 10.

Next, a sixth embodiment of a method for manufacturing a resin container in accordance with the present invention will be explained in detail with reference to FIG. 19 through FIG. 23.

In this case, the same reference numerals will be attached to the same elements as those of the first embodiment, and the explanations thereof will be omitted.

Figure 20A:
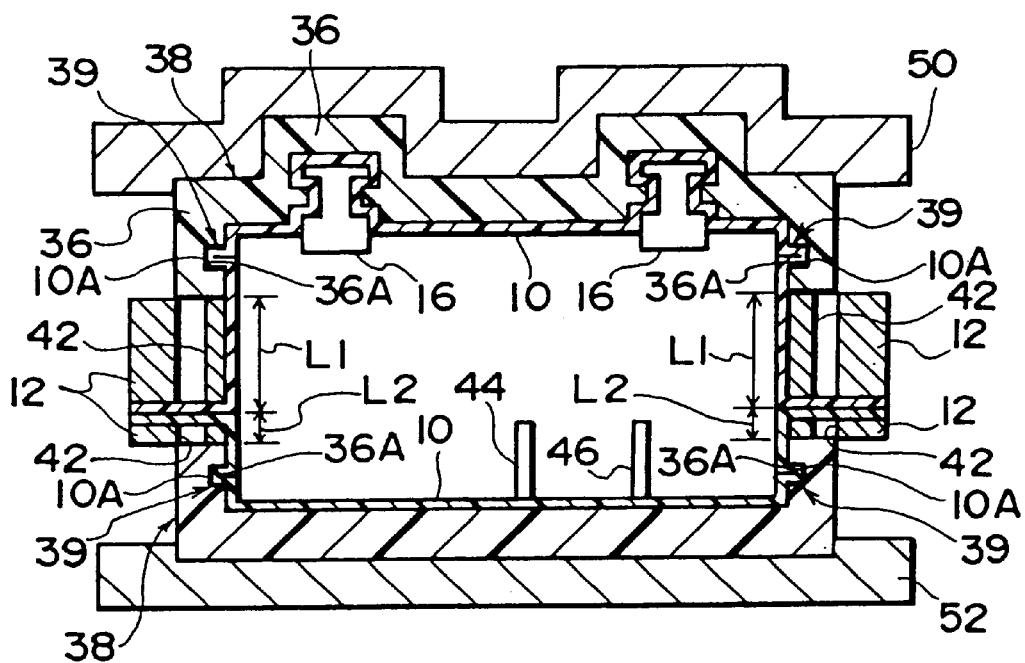
FIG. 20A is a cross sectional view of an apparatus and a container which shows one step of a method for manufacturing a resin container in accordance with a sixth embodiment of the present invention.
Figure 20B:
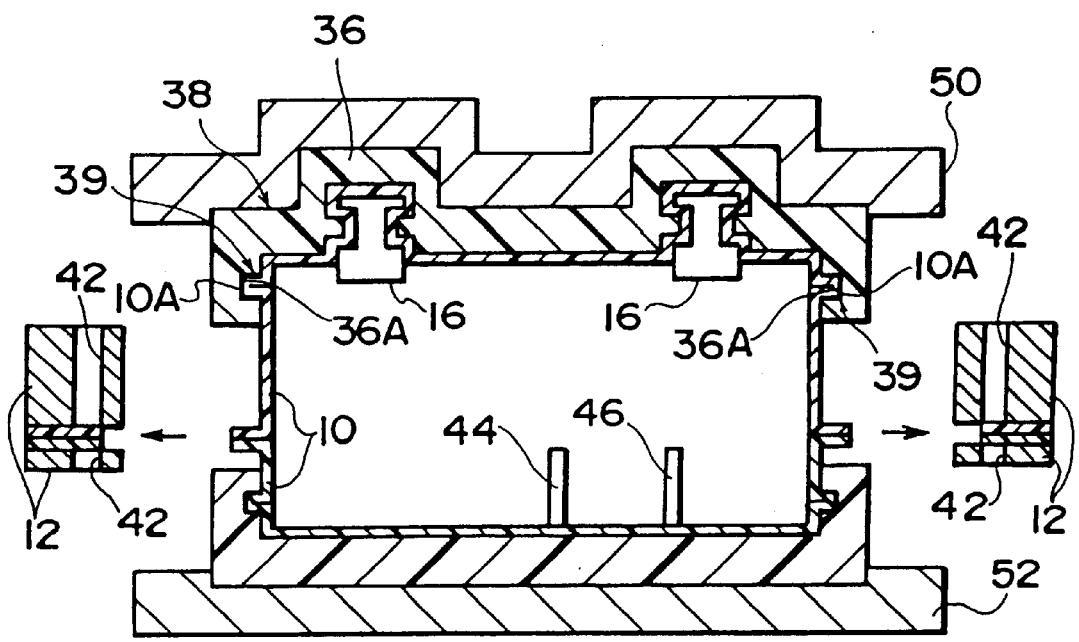
FIG. 20B is a cross sectional view of an apparatus and a container which shows one step of a method for manufacturing a resin container in accordance with a sixth embodiment of the present invention.

As shown in FIG. 20A and FIG. 20B, in the sixth embodiment, a length L1 and a length L2 of the peripheral edges portions of the gas barrier sheets 10 of the combined intermediate molded products 38 are different from each other.

Further, since the convex portion 10P is formed on the gas barrier sheet 10, when the resin layer 36 is formed on the outside of the gas barrier sheet 10 by injection molding, art engaging portion 39 between the convex portion 10P of the gas barrier sheet 10 and the concave portion 36A of the resin layer 36 is formed near the portion held between the heat plate 12 and the pressing plate 14 of the gas barrier sheet 10, that is, in the end portion of the bonding portion between the resin layer 36 and the gas barrier sheet 10.

Figure 21A:
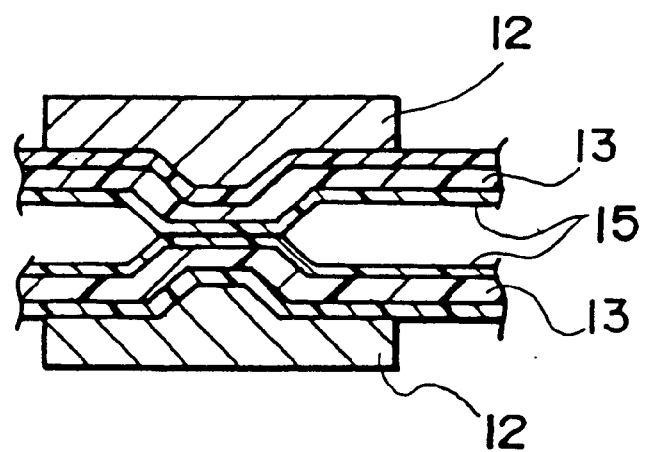
FIG. 21A is an enlarged cross sectional view which shows a state before a bonding portion of a gas barrier sheet is welded in a method for manufacturing a resin container in accordance with a sixth embodiment of the present invention.
Figure 21B:
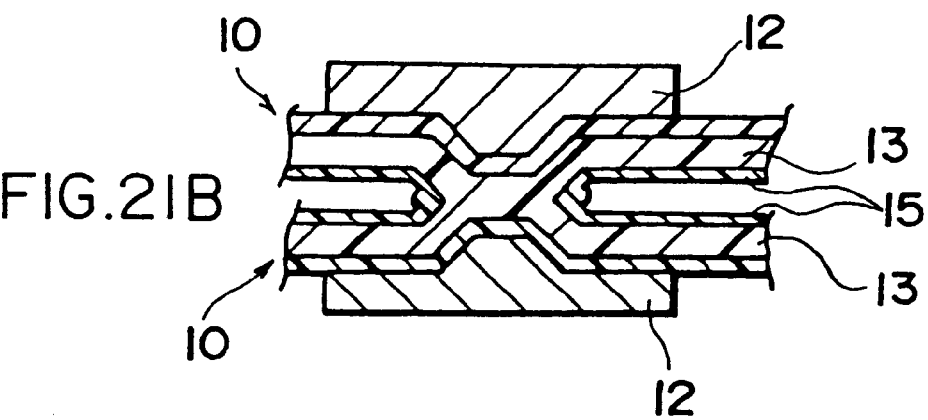
FIG. 21B is an enlarged cross sectional view which shows a state after a bonding portion of a gas barrier sheet is welded in a method for manufacturing a resin container in accordance with a sixth embodiment of the present invention.

Further, as shown in FIG. 21A, the cross sectional shape of the heat plate 12 is formed as a wedge shape. Accordingly, when the peripheral edge of the gas barrier sheet 10 is thermally melt-adhered, as shown in FIG. 21B, the resin layer 15 held between the respective gas barrier layers 13 can be pressed out so that the respective gas barrier layers 13 are melt-adhered to each other. As a result of this, since the structure advantageous for preventing gas permeation, that is, the gas barrier layer 13, can be made into a seamless bag shape, the level of gas permeation can be minimized.

It should be noted that the pressing plate 14 has already been removed from the intermediate molded product 38, by the stage.

Figure 19:
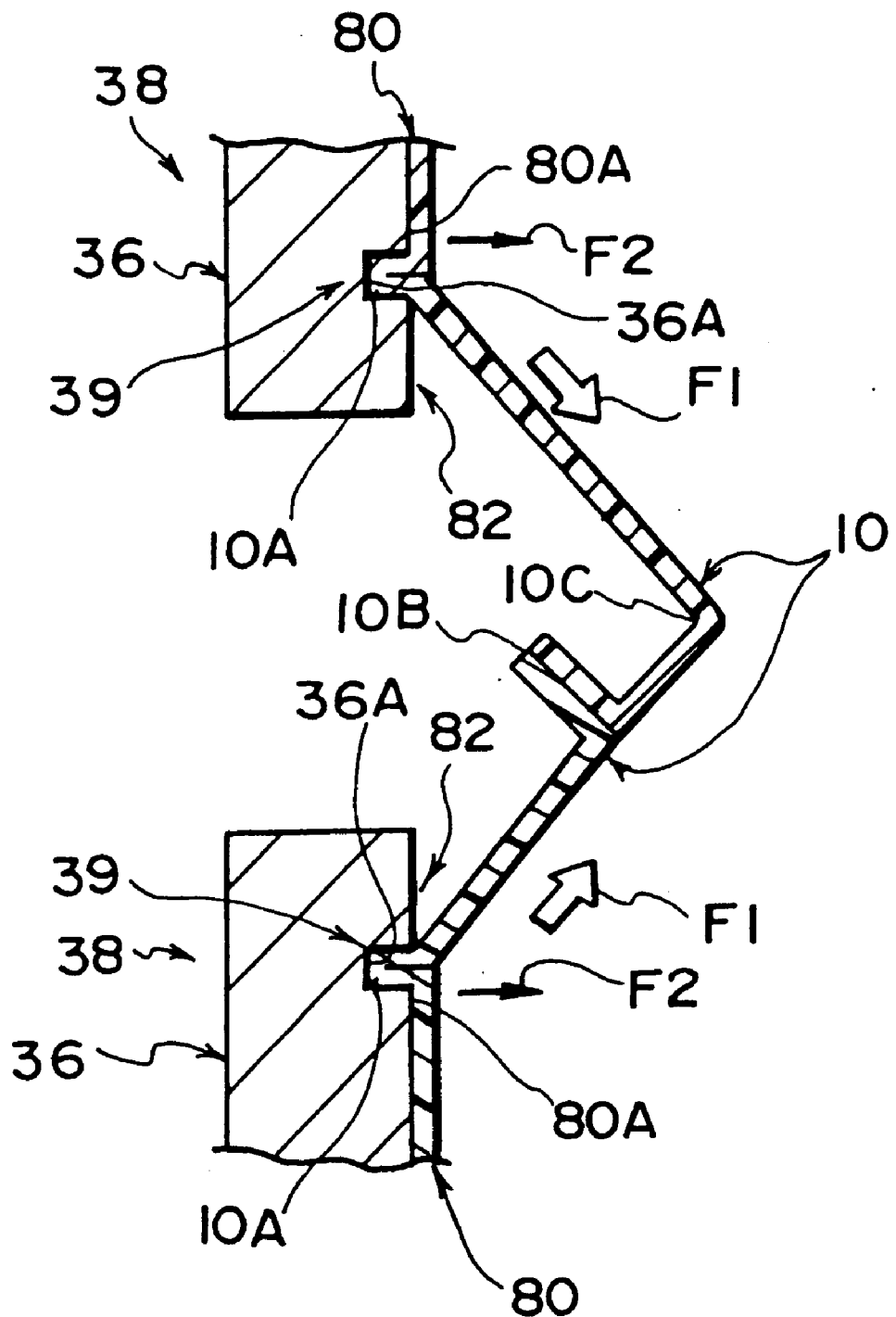
FIG. 19 is an enlarged partial cross sectional view of a bonded portion of a gas barrier sheet and a resin layer in a method for manufacturing a resin container in accordance with a sixth embodiment of the present invention.

Further, in the sixth embodiment, as shown in FIG. 19, since the engaging portion 39 between the convex portion 10P of the gas barrier sheer 10 and the concave portion 36A of the resin layer 36 is formed in an end portion 80A of a bonded portion 80 between the resin layer 36 and the gas barrier sheet 10, when the pressure inside the bag-shaped gas barrier sheet 10 is reduced so as to pull in the gas barrier sheet 10, the stress generated in the gas barrier sheet 10 acts as a tensile force (arrow F2 of FIG. 19) on the gas barrier sheet 10 at the engaging portion 39, but does not act as a peeling force (arrow F2 of FIG. 19) on the bonding portion 80 between the resin layer 36 and the gas battier sheet 10. Accordingly, the gas barrier sheet 10 can be prevented from peeling away from the resin layer 36 or becoming liable to peel away, so that the reliability of the gas barrier sheer 10 can be improved.

In this case, in a portion 82 closer to the bonding portion than the engaging portion 39 of each of the intermediate molded products 38, the portion 82 may be previously made as a non-melt-adhered portion so that the peeling force does not act on the bonded portion 80 between the resin layer 36 and the gas barrier sheet 10.

Further, as shown in FIG. 20A, in the sixth embodiment, since the length L1 and the length L2 of the respective peripheral edge portions of the gas barrier sheets 10 of the combined intermediate molded products 38 are different from each other, as shown in FIG. 19, the position of the joint 10B between the gas barrier sheets 10 and the position of the bend 10C in the gas barrier sheet 10 generated when the sheet is pulled in, do not match each other. As a result of this, the stress generated when the sheet is pulled in is not concentrated on the joint 10B between the gas barrier sheets 10.

Figure 22:
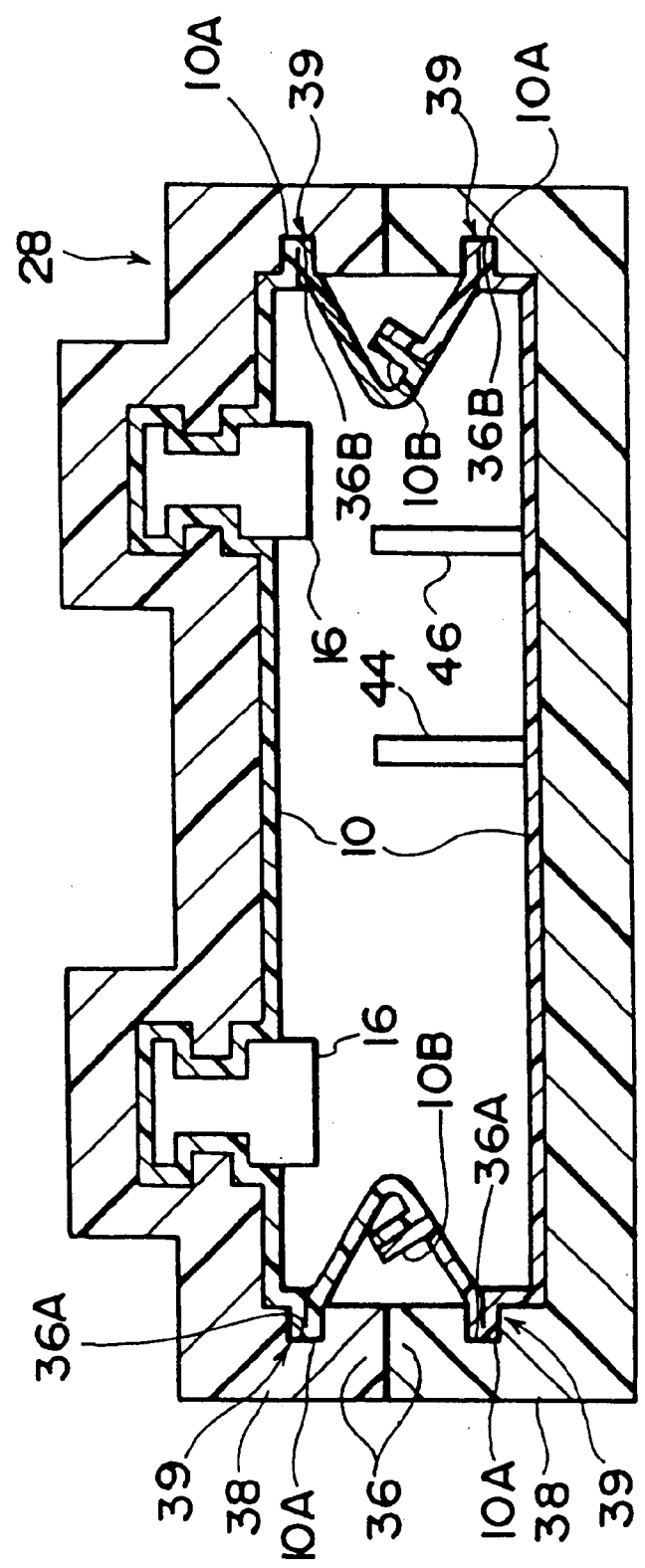
FIG. 22 is a schematical cross sectional view which shows a container manufactured by a method for manufacturing a resin container in accordance with a sixth embodiment of the present invention.

Accordingly, as shown in FIG. 22, in the resin container (the fuel tank) 28 manufactured by this manufacturing method, the engaging portion 39 engaging the convex portion 10A of the gas barrier sheet 10 and the concave portion 36A of the resin layer 36, is formed in the end portion of the bonding portion between the resin layer 36 and the gas barrier sheet 10.

Next, operations of the method for manufacturing the resin container in accordance with the sixth embodiment will be explained.

In the resin container in accordance with the present embodiment, since the engaging portion 39 engaging the convex portion 10P of the gas barrier sheet 10 the concave portion 36A of the resin layer 36, is formed op the end portion 80A of the bonding portion 80 between the resin layer 36 and the gas barrier sheet 10, during the manufacturing process, when the pressure inside the bag-shaped gas barrier sheet 10 is reduced and the gas barrier sheet 10 is pulled in, the stress generated in the gas barrier sheer 10 acts as a tensile force (arrow F1 of FIG. 19) on the gas barrier sheet 10 at the engaging portion 39, but does not act as a peeling force on the bonding portion 80 between the resin layer 36 and the gas barrier sheet 10. Accordingly, the reliability of the gas battier sheer 10 can be improved.

Further, in the sixth embodiment, as shown in FIG. 20A, the length L1 and L2 of the peripheral edge portions of the gas barrier sheets 10 of the combined intermediate molded products 38 are different from each other. Accordingly, as shown in FIG. 19, since the position of the joint 10B between the gas barrier sheets 10 and the position of the bend 16C in the gas barrier sheet 10 generated when the sheet is pulled in, do not match each other, the stress generated when the sheet is pulled in is not concentrated on the joint 10B, so that the reliability of the gas barrier sheet 10 can be further improved.

Further, in the present embodiment, as shown in FIG. 21A, since the cross section of the heat plate 12 is made wedge shaped, when the peripheral edge portion of the gas barrier sheet 10 are thermally melt-adhered, as shown in FIG. 21B, the resin layer 15 held between the respective gas barrier layers 13 can be pressed out and the respective gas barrier layers 13 can be melt-adhered to each other, so that the amount of the gas permeation can be minimized.

Figure 23A:
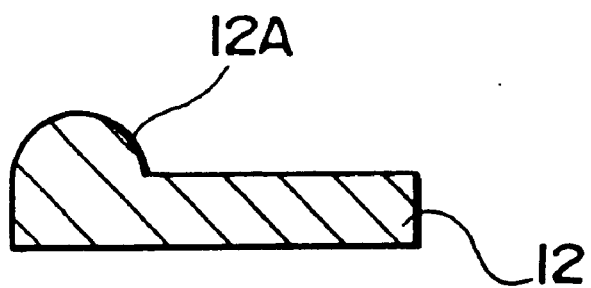
FIG. 23A is a schematical cross sectional view which shows a heat plate used for a method for manufacturing a resin container in accordance with a modified embodiment of the sixth embodiment of the present invention.
Figure 23B:
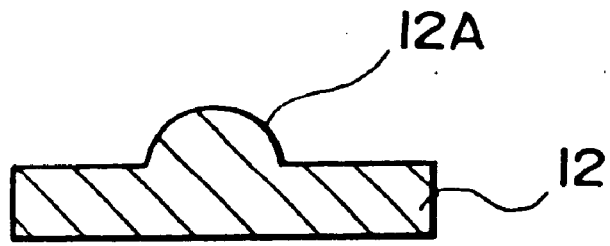
FIG. 23B is a schematical cross sectional view which shows a heat plate used for a method for manufacturing a resin container in accordance with a further modified embodiment of the sixth embodiment of the present invention.

Further, in the sixth embodiment, the cross sectional shape of the heat plate 12 is made wedge shaped, however, the cross sectional shape of the heat plate 12 is not limited to this, and can be made as other convex shapes FIG. 23A and FIG. 23B show examples of a cross sectional shape having a circular convex portion 12A so that the resin layer held between the respective gas barrier layers can be pressed out by the convex portion 12A.

Further, in the sixth embodiment, the process for injection molding is shown, however, the present invention can be applied to injection press molding, hot flow stamping molding, and sheet flow stamping molding. Further, high frequency welding can be applied as the film welding method.

Next, a seventh embodiment of a method for manufacturing a resin container in accordance with the present invention will be explained in detail with reference to FIG. 24 and FIG. 25.

In this case, the same reference numerals will be attached to the same elements as those of the first embodiment, and the explanation thereof will be omitted.

Figure 24:
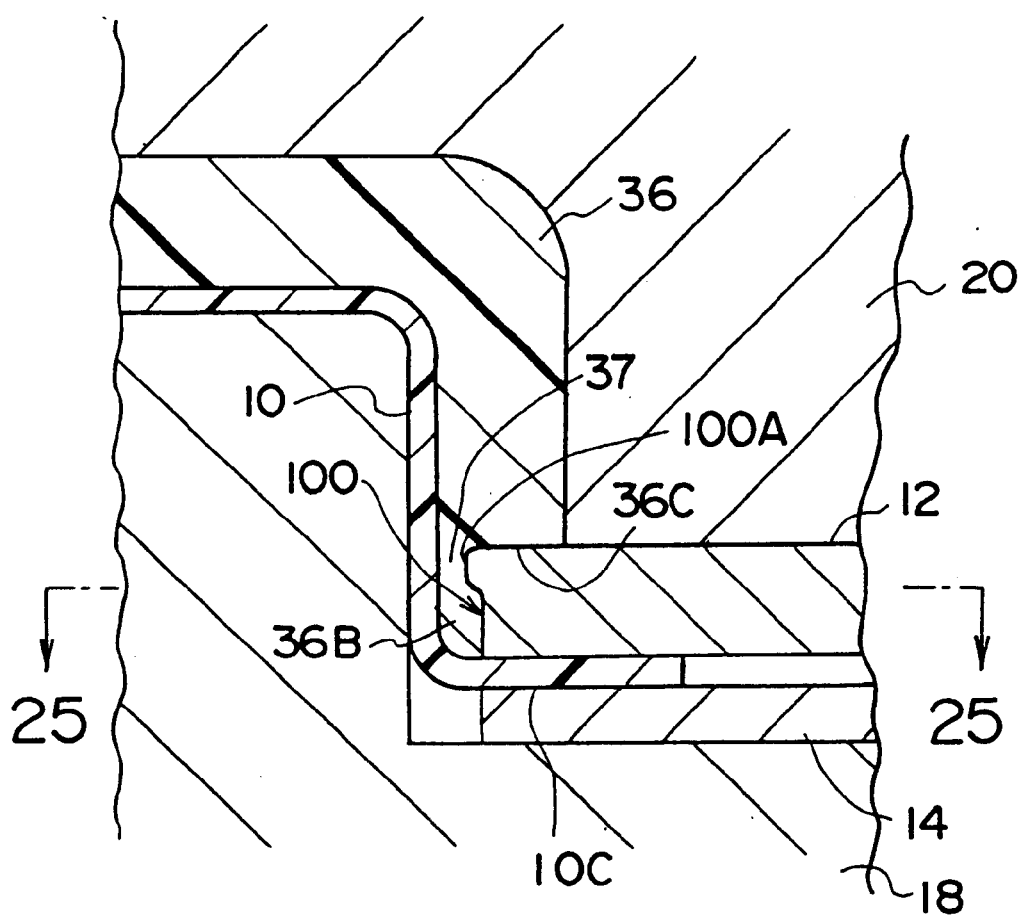
FIG. 24 is an enlarged cross sectional view of a bonded portion of a heat plate, a gas barrier sheet, and a resin layer near the heat plate in a method for manufacturing a resin container in accordance with a seventh embodiment of the present invention.
Figure 25:
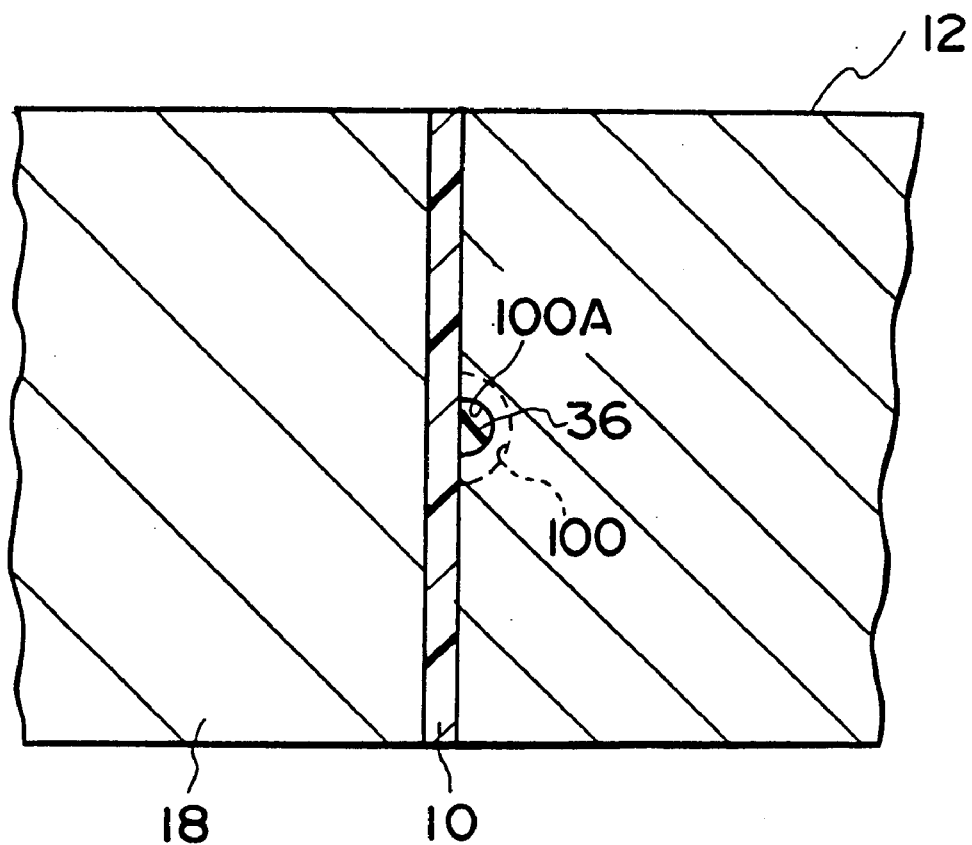
FIG. 25 is a cross sectional view along a line 25—25 in FIG. 24.

As shown in FIG. 24, in the seventh embodiment, a notch 100 is formed in the edge portion of the heat plate 12 opposed to the gas barrier sheet 10 along the gas barrier sheet 10, and the opening 100A of the notch 100 disposed on the opposite side to the bonding portion 10C on the gas barrier sheet 10 is made with a small diameter. Further, as shown in FIG. 25, the cross section of the notch 100 is made in a half circular shape.

Accordingly, in the intermediate molded product molding step, an extension portion 36B is formed extending from a point 36C where a portion of the resin layer 36 bonds with the other intermediate molded product to the bonding portion 10C of the gas barrier sheet 10.

Next, operations of the method for manufacturing the resin container in accordance with the seventh embodiment will be explained.

In the resin container in accordance with the seventh embodiment, since the extended portion 36B of the resin layer 36 imparts tension to the bonding portion 10C of the gas barrier sheet 10 in the intermediate molded product molding step, the creases in the connecting portion 10C of the gas barrier sheet 10 can be restricted. Further, when the bonding portions 36C of the resin layers 36 are melt-adhered to each other, the extension portion 36B is easily broken at the neck portion 37 formed by the opening portion 100A of the notch 100 and is drawn into the container together with the gas barrier sheet 10.

Next, an eighth embodiment of a method for manufacturing a resin container in accordance with the present invention will be explained in detail with reference to FIG. 26.

In this case, the same reference numerals will be attached to the same elements as those of the first embodiment, and the explanation thereof will be omitted.

Figure 26:
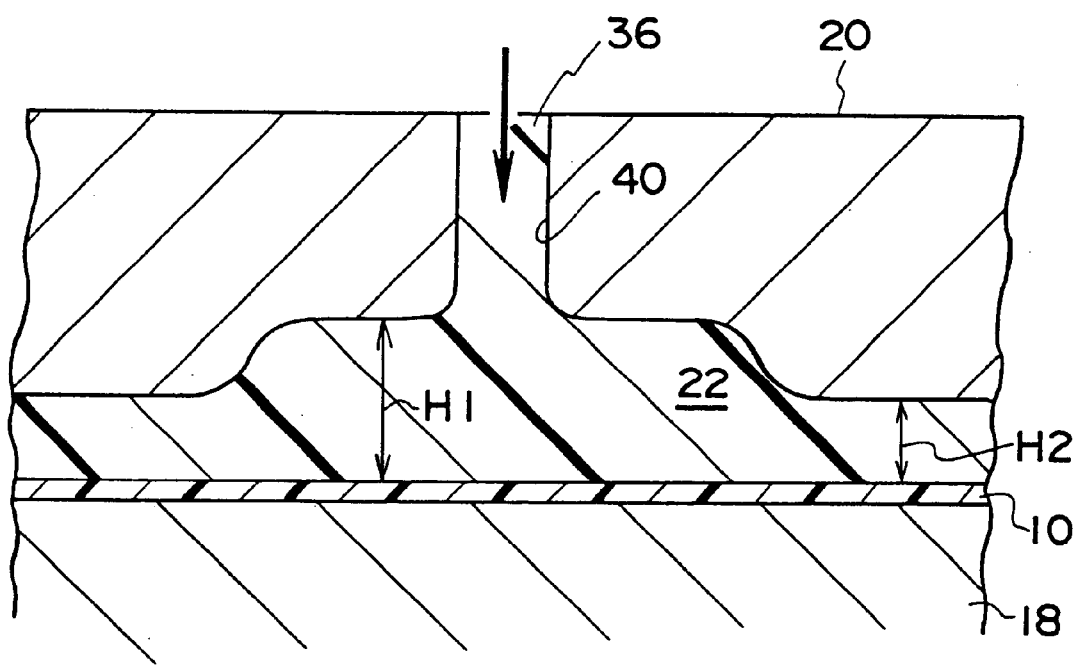
FIG. 26 is a cross sectional view of an apparatus and a container which shows a portion near a resin injecting heat plate in a method for manufacturing a resin container in accordance with an eighth embodiment of the present invention.

As shown in FIG. 26, in the eighth embodiment, in the intermediate molded product forming step, a gap H1 within the cavity 22 near the resin injecting hole 40 of the upper mold 20 is wider than a gap H2 of the other portions.

Next, operations of the method for manufacturing the resin container in accordance with the eighth embodiment will be explained.

In the intermediate molded product molding step, when molten resin is poured on the gas barrier sheet 10 disposed on the lower mold 18 from the resin injecting hole 40 provided on the upper mold 20 (the arrow iii FIG. 26 shows the flow of the molten resin), the portion 10P of the gas barrier sheet 10 opposite the resin injecting bole 40 and the area surrounding the portion 10P ate affected by the influence of the heat of the molten resin which is increased by the shear force imparted by the resin injecting hole 40 and the friction force from the molten resin.

At this time, in the eighth embodiment, since the gap HI inside the cavity 22 near the resin injecting hole 40 on the gas barrier sheet 10 is wider than the gap H2 of the other portions, the flow speed of the molten resin can be restricted. As a result of this, the gas barrier sheet 10 can be prevented from being melted and the reliability of the gas barrier sheet 10 can be improved.

Next, a ninth embodiment of a method for manufacturing a resin container in accordance with the present invention will be explained in detail with reference to FIG. 27.

In this case, the same reference numerals will be attached to the same elements as those of the first embodiment, and the explanation thereof will be omitted.

Figure 27:
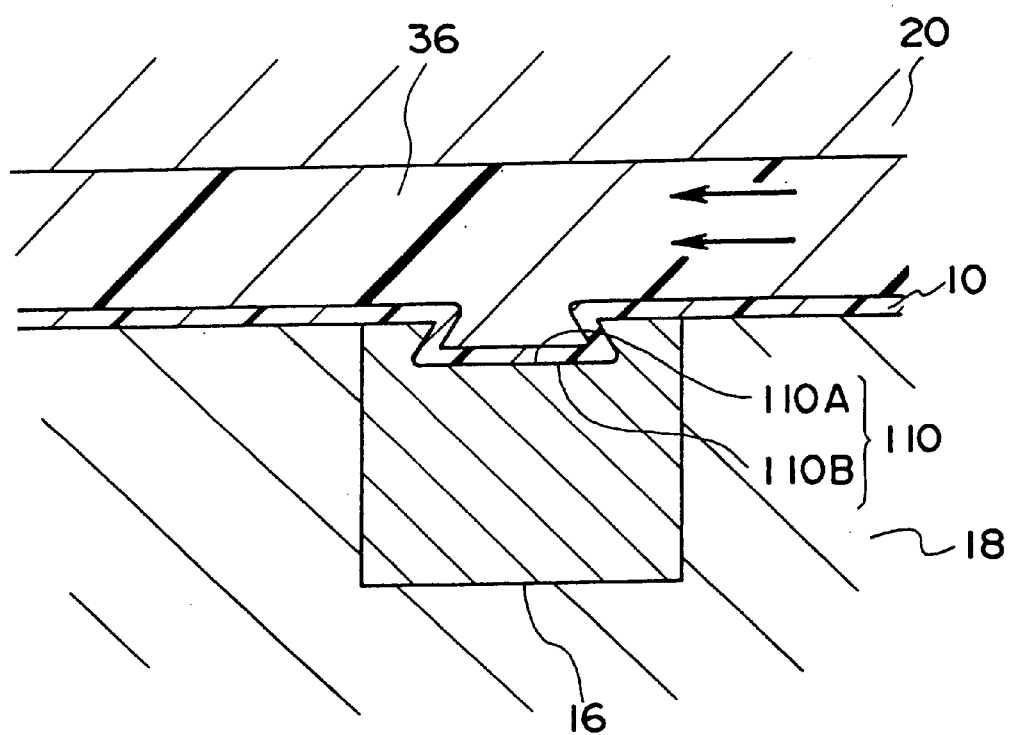
FIG. 27 is a cross sectional view of an apparatus and a container which shows a part engaging portion in a method for manufacturing a resin container in accordance with a ninth embodiment of the present invention.

As shown in FIG. 27, in the ninth embodiment, in an engaging portion 110 between an attachment part, such as the cut off valve 16 and the like, and the gas barrier sheet 10 the engaging portion 110A of the attachment part is formed as a concave shape. Accordingly, in the intermediate molded product molding process, when the attachment part such as the cut off valve 16 or the like is covered by the gas barrier sheet 10, the engaging portion 110A of the attachment part is formed as a concave shape and the engaging portion 110A of the gas barrier sheet 10 is formed as a convex shape.

Next, operations of the method for manufacturing the resin container in accordance with the ninth embodiment will be explained.

In the ninth embodiment, as shown in FIG. 27, since the engaging portion 110A of the attachment part such a cut off valve 16 is formed as a concave shape in the engaging portion 110, which is different from in case that the engaging portion of the attachment part such a cut off valve 16 is formed as a convex shape as shown in FIG. 1B, in the intermediate molded product molding process, the engaging portion 100 can reduce the heat and the friction force imparted by the molten resin (the arrow in FIG. 27 shows the flow of the molten resin). As a result of this, fusion due to accumulated heat between the attachment part and the gas barrier sheet 10 is not generated in the engaging portion 100, so that the reliability of the gas barrier sheet 10 can be improved.

In the above, the present invention has been explained with respect to the specified embodiments, however, the present invention is not limited to the above embodiments, and it will be clear to those skilled in the art that other various embodiments are possible within the scope of the present invention. For example, in the above, a fuel tank for an automotive vehicle is used as an example of a resin container 22, however, the resin container 22 is not limited to fuel tanks for automotive vehicles. Further, the material of the gas barrier sheet 10 and the material of the resin layer 36 are not limited to those explained above.

Figure 28:
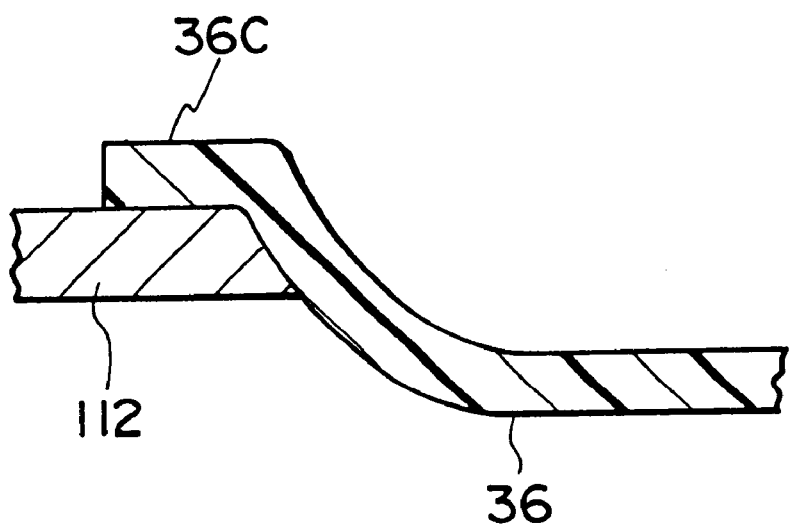
FIG. 28 is a partial cross sectional view of a jig and a container which shows a shape correcting step of a method for manufacturing a resin container in accordance with a modified embodiment of the present invention.
Figure 29:
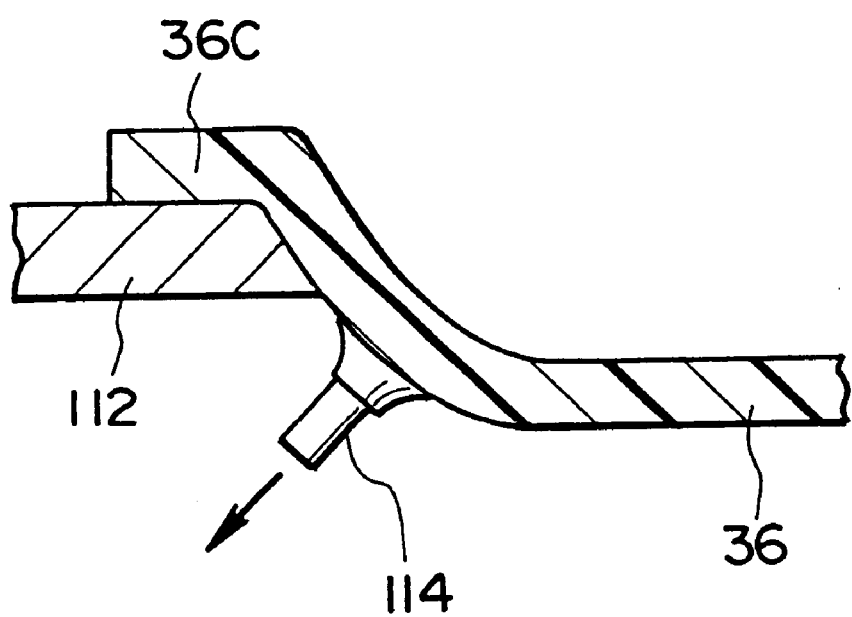
FIG. 29 is a partial cross sectional view of a jig and a container which shows a shape correcting step of a method for manufacturing a resin container in accordance with a modified embodiment of the present invention.

Further, in order to improve strength, air tightness, appearance and the like of the bonding portion between the peripheral edge portions of the resin layers 36 of the intermediate molded products 38, as shown in FIG. 28, after reheating the molded and cooled resin layer 36, or while it is still warm, the resin layer 36 may be set to a jig 112 so as to correct the shape of the bonding portion (the peripheral edge portion) 36C. At this time, as shown in FIG. 29, by using a vacuum shape correcting machine 114 and the like, external force maybe applied to the resin layer 36. Further, when the external force is given during the melt-adhering of the peripheral edges of the resin layers 36 of the combined intermediate molded products 38 (resin melt-adhering step), it is more effective.

Figure 30:
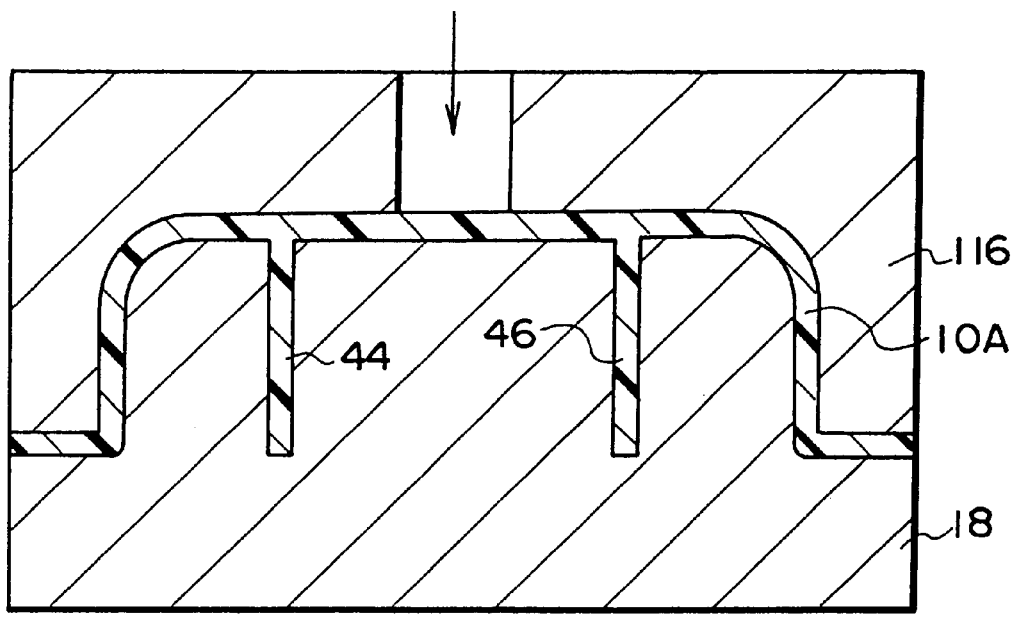
FIG. 30 is a cross sectional view of an apparatus and a container which shows a gas barrier layer forming step of a method for manufacturing a resin container in accordance with a modified embodiment of the present invention.
Figure 31:
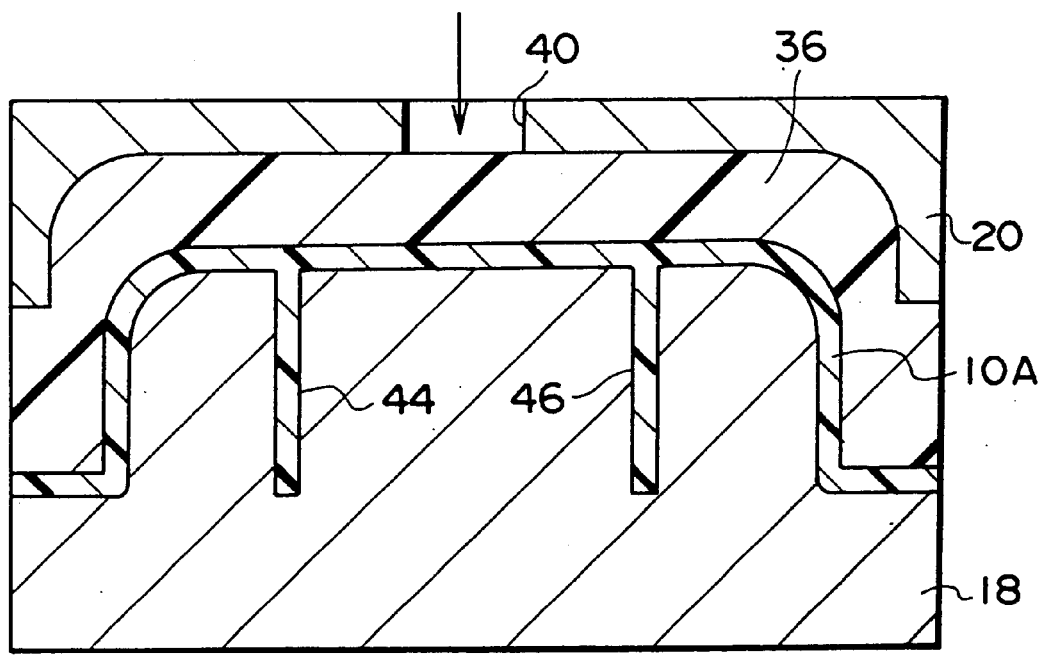
FIG. 31 is a cross sectional view of an apparatus and a container which shows a resin layer forming step of a method for manufacturing a resin container in accordance with a modified embodiment of the present invention.
Figure 32:
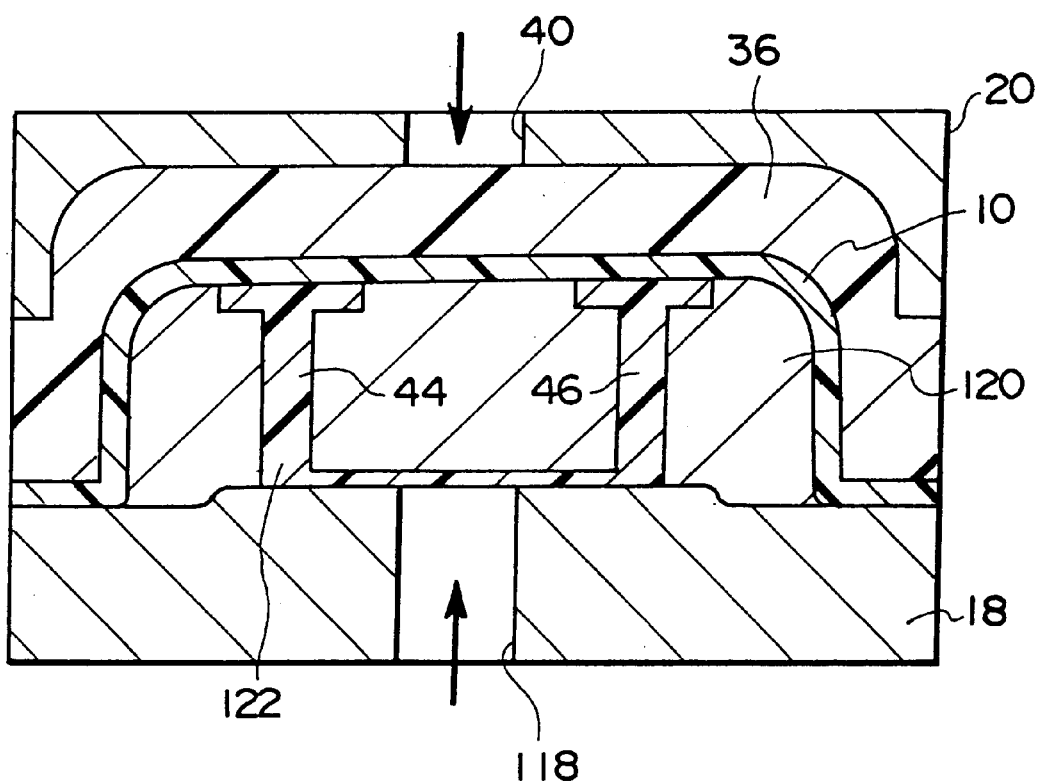
FIG. 32 is a cross sectional view of an apparatus and a container which shows an attachment part forming step of a method for manufacturing a resin container in accordance with a modified embodiment of the present invention.

Further, as shown in FIG. 30, the gas barrier layer 10P may be formed between the lower mold 18 and an upper mold 116 by injection molding (the arrow in FIG. 30 shows the flow of the molten resin), thereafter, as shown in FIG. 31, the upper mold 116 may be replaced by the upper mold 20, and the resin layer 36 may be formed between the upper mold 20 and, the gas barrier layer 10P by injection molding (the arrow in FIG. 31 shows the flow of the molten resin). Accordingly, productivity and moldability is improved. Further, since the thickness and the quality of the material of the gas barrier layer 10P can be changed in the upper portion and the lower portion or the front portion and the rear portion, or the like of the resin container, the optimum gas permeation preventing performance, strength and formability can be guaranteed. Further, by funning inner structural portions such as a sub tank 44, a separator 46, and the like integrally with the gas battier layer 10P, a resin container with a seamless gas barrier layer 10P can be efficiently produced. Further, as a method for producing the resin container with a seamless gas barrier layer 10P, as shown in FIG. 32, a resin injecting port 118 is provided iii the lower mold 18, a resin 122 is poured into the cavity of a middle mold 120 from the resin injecting port 118 (the arrow in FIG. 32 shows the flow of the molten metal), so that the inner structural portions such as the sub tank 44, the separator 46, and the like bonded to the gas barrier layer 10P may be formed.

Figure 33:
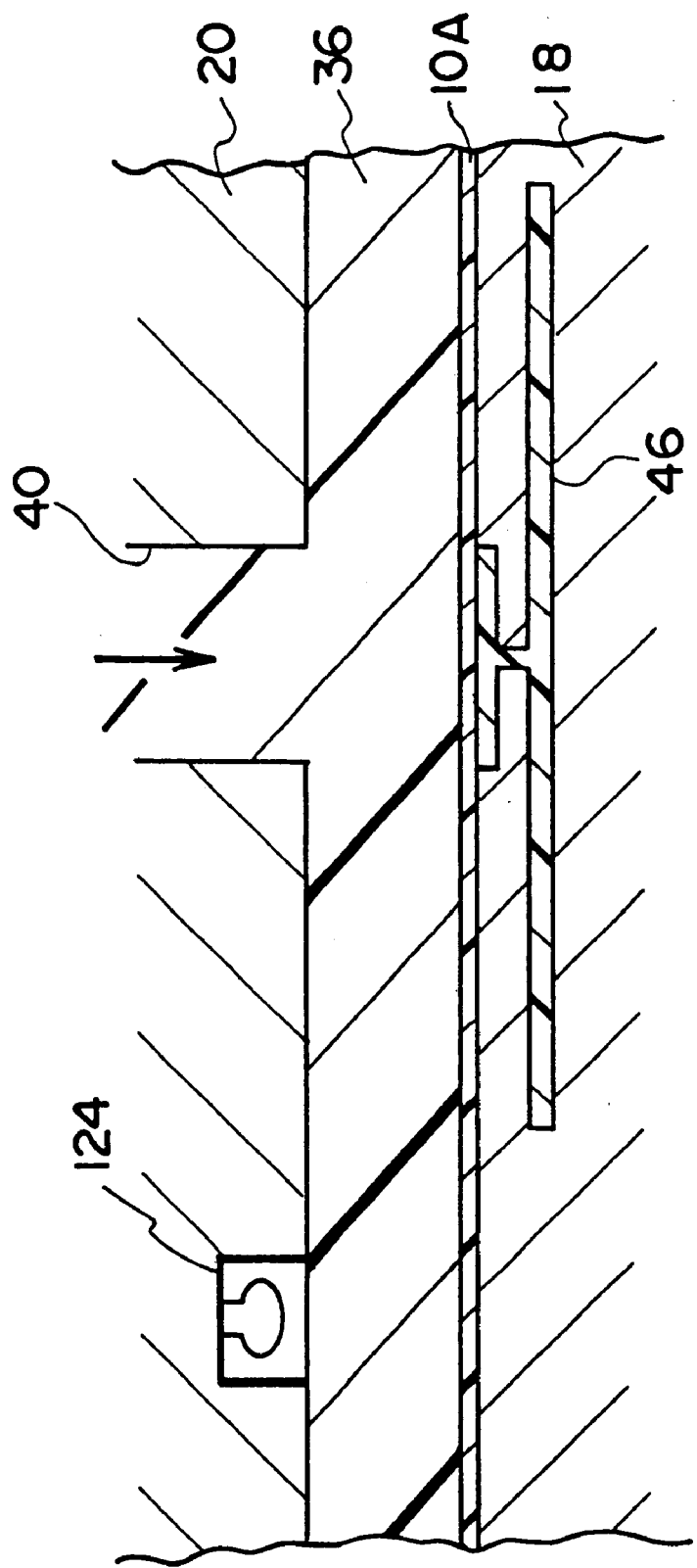
FIG. 33 is a cross sectional view of an apparatus and a container which shows a resin layer forming step of a method for manufacturing a resin container in accordance with a modified embodiment of the present invention.
Figure 34A:
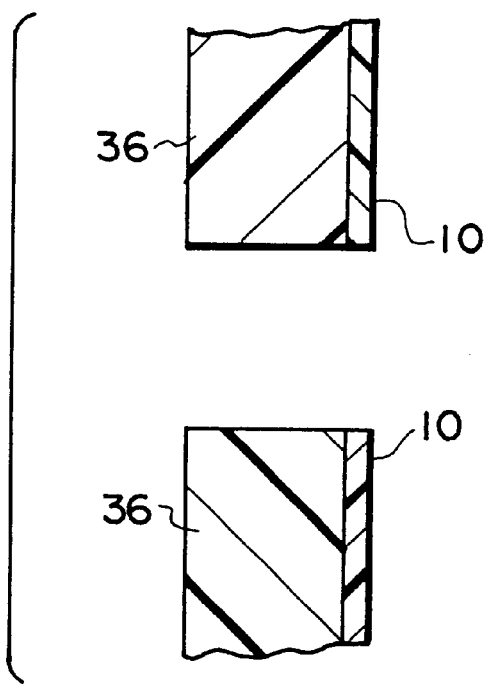
FIG. 34A is an enlarged cross sectional view which shows a state before bonding portions of a resin layer and a gas barrier sheet are welded in a method for manufacturing a resin container in accordance with a modified embodiment of the present invention.
Figure 34B:
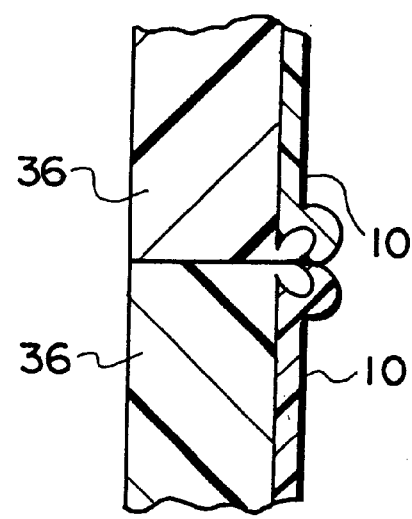
FIG. 34B is an enlarged cross sectional view which shows a state after bonding portions of a resin layer and a gas barrier sheet are welded in a method for manufacturing a resin container in accordance with a modified embodiment of the present invention.
Figure 35A:
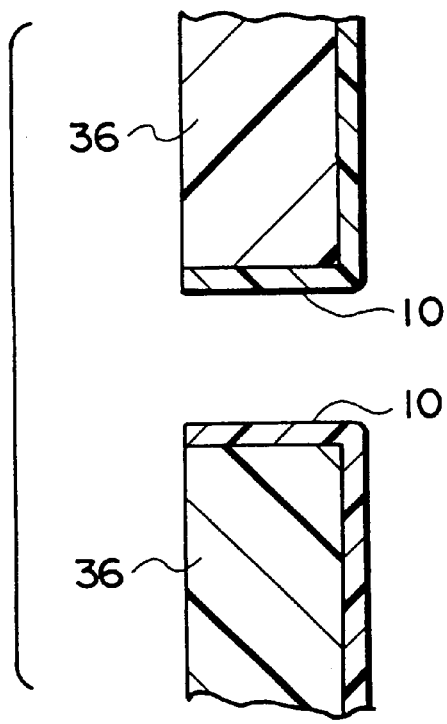
FIG. 35A is an enlarged cross sectional view which shows a state before bonding portions of a resin layer and a gas barrier sheet are welded in a method for manufacturing a resin container in accordance with a modified embodiment of the present invention.
Figure 35B:
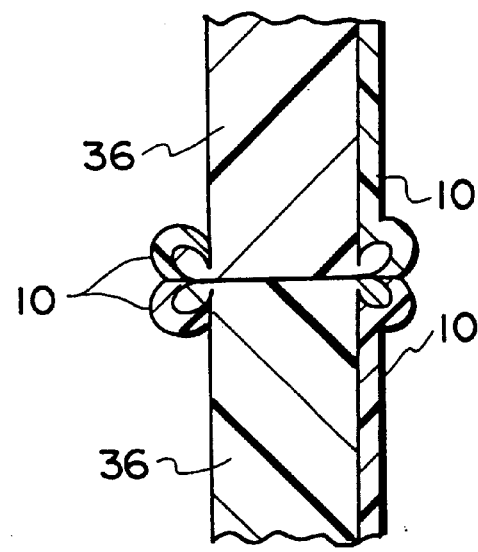
FIG. 35B is an enlarged cross sectional view which shows a state after bonding portions of a resin layer and a gas barrier sheet are welded in a method for manufacturing a resin container in accordance with a modified embodiment of the present invention.
Figure 36:
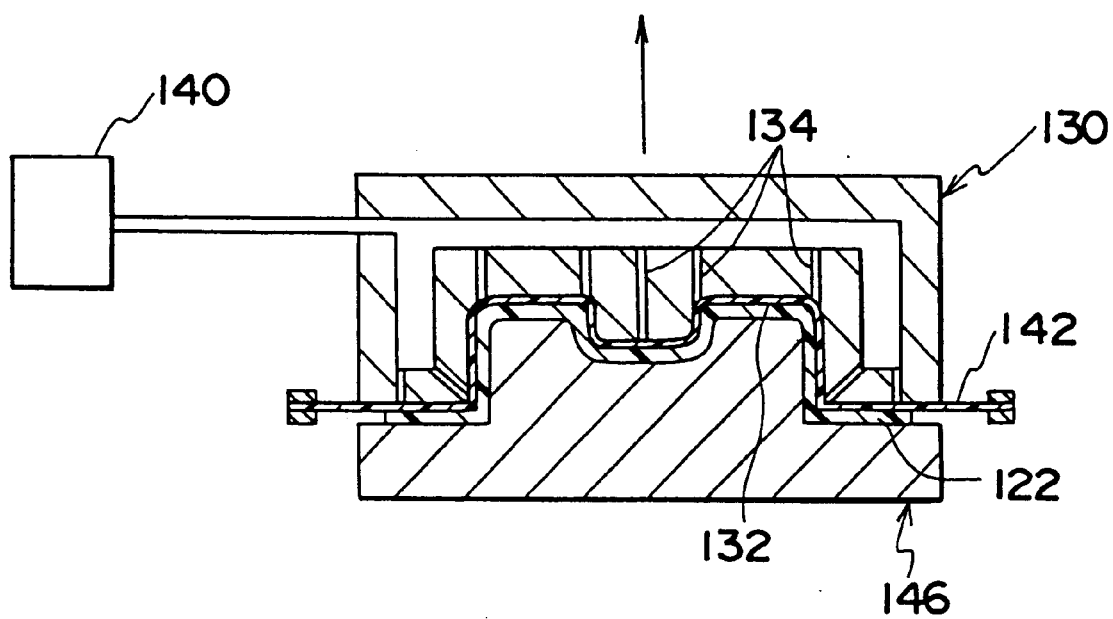
FIG. 36 is a schematic cross sectional view which shows a part of a method for manufacturing a resin container in accordance with a conventional embodiment.

Further, as shown in FIG. 33, in order to improve productivity, at the same time as the resin layer 36 is formed by injection molding (the arrow in FIG. 33 shows the how of the molten resin), the inner structural portions such as the separator 46 and the like set on the lower mold 18, and a clamp 124 and the like set on the upper mold 20 may be simultaneously melt-adhered. At this time, by using a resin having a gas barrier capacity for the timer structural portions such as the separator 46 and the like which are melt-adhered to the gas barrier layer 10P, breakage of the gas barrier layer during melt-adhering can be prevented.

Further, as shown in FIG. 34A, FIG. 34B, FIG. 35A and FIG. 35B, in order to improve productivity, at the same time as the resin layers 36 are melt-adhered to each other, the gas barrier sheets 10 may be melt-adhered to each other by the heat from the resin layer 36.

Industrial Applicability

As mentioned above, the resin container and the method for manufacturing the same in accordance with the present invention are effective for fuel tanks for automotive vehicles and the manufacturing thereof, and in particular, for improving the gas permeation preventing performance in the area where the intermediate formed products of a fuel tank for an automotive vehicle are bonded to each other.

What is claimed:

1. A method for manufacturing a resin container comprising:

holding peripheral edges of a sheet member between a heating plate containing a heater and a pressing plate;

setting said sheet member in a lower mold such that said sheet member is adhered to a surface of said lower mold by reducing the pressure between said lower mold and said sheet member and then setting an upper mold onto said lower mold such that the peripheral edges of said upper mold contact the beating plate and a cavity is formed between said sheet member and the inner surface of said upper mold;

forming a first intermediate molded product by pouring molten resin inside of the cavity, and cooling and solidifying the molten resin to form a resin layer;

forming a second intermediate molded product having a resin layer and a sheet layer;

melt-adhering the sheet member of said first intermediate product with the sheet member of said second intermediate product by superimposing the peripheral portions of respective sheet members of said first and second intermediate molded products so that said sheet members of said first and second intermediate molded products form a bag-like structure with said resin members not contacting each other, removing a portion of the peripheral edges of the sheet members along with rite heating plate by which said sheet members are held; and pressing the intermediate molded products onto each other so as to melt-adhere the respective resin layers of said first and second intermediate products to each other.

2. A method for manufacturing a resin container according to claim 1, wherein when said pressing is carried out, pressure inside of the bag structure is reduced so that the joined portions of the sheet member are not caught between edges of respective resin layers of the first and second intermediate products being joined.

3. A method for manufacturing a resin container according to claim 2, further comprising exhausting gas between said sheet members and said resin layers.

4. A method for manufacturing a resin container according to claim 1, wherein said sheet member is melt-adhered to the resin layer at the temperature at which resin layers of respective intermediate molded products are melt-adhered to each other.

5. A method for manufacturing a resin container according to claim 1, wherein a peripheral portion of said resin layer has a non-melt adhered portion of said sheet member and said resin layer.

6. A method for manufacturing a resin container according claim 5, wherein a cooling portion is provided in a portion of a mold corresponding to the peripheral portion of said resin layer and is used during forming of said intermediate molded product.

7. A method for manufacturing a resin container according to claim 1, wherein said sheet members are constructed and arranged so as to have engaging portions which are engaged with each other where said sheet members are bonded to each other before said sheet members are melt-adhered to each other.

8. A method for manufacturing a resin container according to claim 1, further comprising providing a reinforcing layer, which is not melted by injected resin at least on an area of said sheet member opposite a resin injecting hole.

9. A method for manufacturing a resin container according to claim 1, further comprising forming engaging portions for engaging bonding end portions between said resin layers and said sheet members with each other in during forming of said intermediate molded product.

10. A method for manufacturing a resin container according to claim 2, wherein the distance of the bonding portion between the respective sheet members and the resin layers is different from the distance of the bonding portion between said sheet members prior to melt-adhering.

11. A method for manufacturing a resin container according to claim 1, wherein forming said intermediate molded product includes the distance between the sheet member and the upper mold near a resin injecting hole being wider than the distance between the sheet member and the upper mold distant from the resin injecting hole.

12. A method for manufacturing a resin container according to claim 1, wherein in an engaging portion between an attached part and said sheer member said attached part is made concave.

* * * * *

UNITED STATES PATENT AND TRADEMARK OFFICE
CERTIFICATE OF CORRECTION

PATENT NO.    : 6,616,788 B2
DATED         : September 9, 2003
INVENTOR(S)   : Kido et al.

Page 1 of 1

It is certified that error appears in the above-identified patent and that said Letters Patent is hereby corrected as shown below:

<u>Title page,</u>
Item [*] Notice, should read:
-- Subject to any disclaimer, the term of this patent is extended or adjusted under 35 U.S.C. 154(b) by 21 days. --.

Signed and Sealed this

Twenty-second Day of November, 2005

JON W. DUDAS
*Director of the United States Patent and Trademark Office*